United States Patent
Yin et al.

(10) Patent No.: US 8,259,762 B2
(45) Date of Patent: *Sep. 4, 2012

(54) SYMMETRICAL CLOCK DISTRIBUTION IN MULTI-STAGE HIGH SPEED DATA CONVERSION CIRCUITS

(75) Inventors: Guangming Yin, Foothill Ranch, CA (US); Bo Zhang, Las Flores, CA (US); Mohammad Nejad, Newport Beach, CA (US); Jun Cao, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 78 days.

This patent is subject to a terminal disclaimer.

(21) Appl. No.: 12/857,049

(22) Filed: Aug. 16, 2010

(65) Prior Publication Data

US 2010/0306568 A1  Dec. 2, 2010

Related U.S. Application Data

(63) Continuation of application No. 12/014,094, filed on Jan. 15, 2008, now Pat. No. 7,778,288, which is a continuation of application No. 10/609,058, filed on Jun. 28, 2003, now Pat. No. 7,319,706.

(60) Provisional application No. 60/403,457, filed on Aug. 12, 2002.

(51) Int. Cl.
*H04J 3/02* (2006.01)
(52) U.S. Cl. ............................................ 370/541
(58) Field of Classification Search ............... 370/350, 370/535–545; 375/354–357
See application file for complete search history.

(56) References Cited

U.S. PATENT DOCUMENTS 5,940,456 A * 8/1999 Chen et al. ............... 370/540

* cited by examiner

*Primary Examiner* — Pao Sinkantarakorn
(74) *Attorney, Agent, or Firm* — Garlick & Markison; Kevin L. Smith

(57) ABSTRACT

Provided is a high speed bit stream data conversion circuit that includes input ports to receive first bit streams at a first bit rate. Data conversion circuits receive the first bit streams and produce second bit stream(s), wherein the number and bit rate of the first and second bit stream(s) differ. Symmetrical pathways transport the first bit streams from the input ports to the data conversion circuits, wherein their transmission time(s) are substantially equal. A clock distribution circuit receives and symmetrically distributes a clock signal to data conversion circuits. A central trunk coupled to the clock port and located between a first pair of circuit pathways with paired branches that extend from the trunk and that couple to the data conversion circuits make up the clock distribution circuit. The distributed data clock signal latches data in data conversion circuits from the first to the second bit stream(s).

20 Claims, 21 Drawing Sheets

Receiver Input and Source Centered Clock Performance

| Parameter | Symbol | Conditions | Min | Typ | Max | Units |
|---|---|---|---|---|---|---|
| Output Common Mode | Vcm | See Figure Below | 1575 | 1675 | 1775 | mV |
| Single Ended Output Impedance | $Z_{SE}$ | | 40 | 50 | 60 | Ω |
| Differential Input impedance | $Z_d$ | | 80 | 100 | 120 | Ω |
| Input Impedance Mismatch | $Z_M$ | | | | 10 | % |
| Q40, CML Input Differential Amplitude, p-p | Δ VQDO | See Figure Below | 400 | 500 | 600 | mV |
| Q40 Input Rise and Fall Time (20% to 80%) | $t_{RII}$, $t_{FII}$ | | | 25 | | ps |
| Differential output return loss* | S11 | Up to 7.5 GHz | 10 | | 35 | dB |

4-by-1 mux input return loss >15 db at 10 GHz

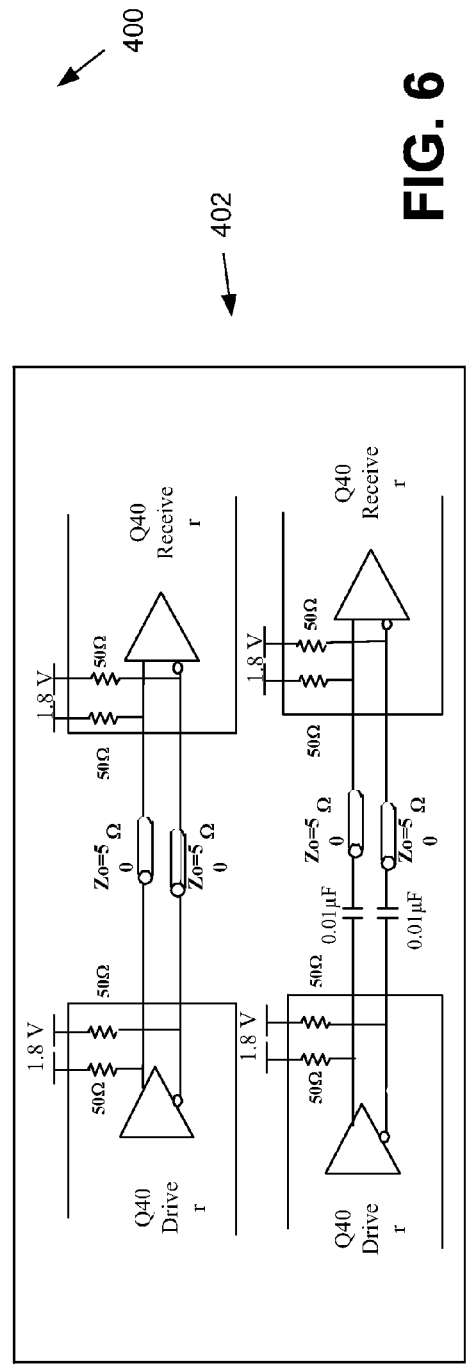

FIG. 6

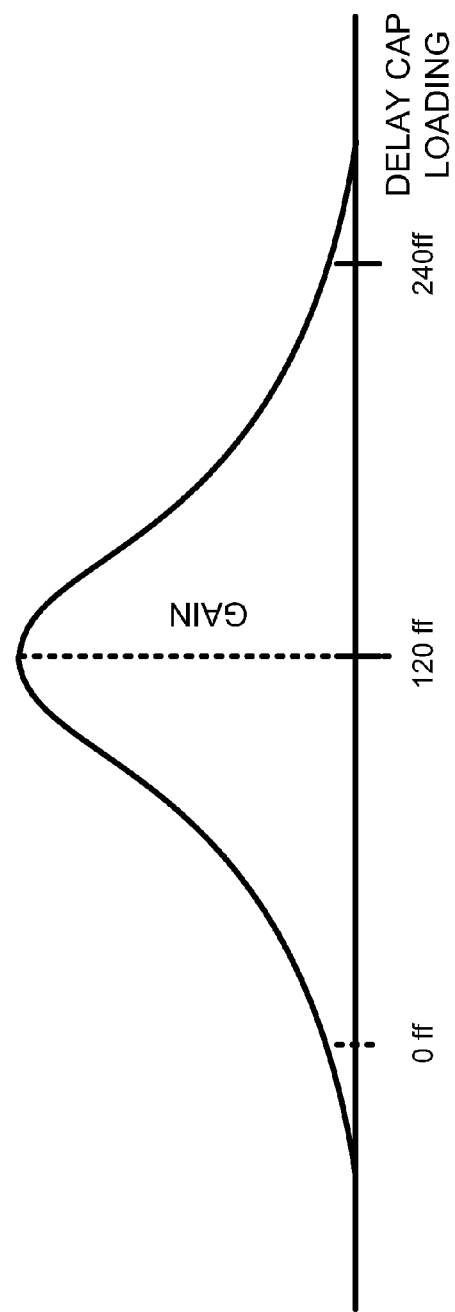
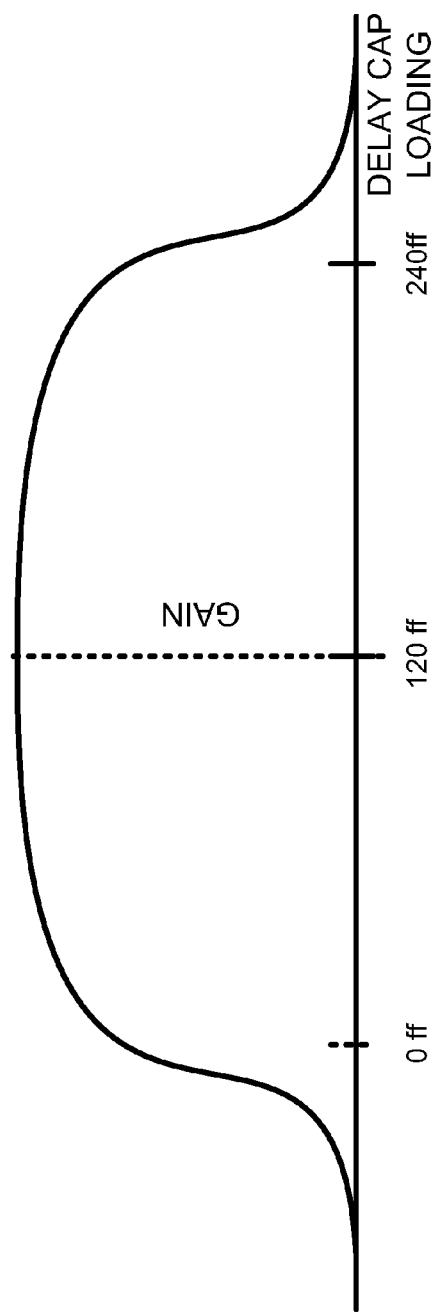

SYMMETRICAL CLOCK DISTRIBUTION IN MULTI-STAGE HIGH SPEED DATA CONVERSION CIRCUITS

RELATED APPLICATIONS

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:
1. U.S. Utility application Ser. No. 12/014,094, entitled "Symmetrical Clock Distribution in Multi-Stage High Speed Data Conversion Circuits," filed Jan. 15, 2008, now issued as U.S. Pat. No. 7,778,288, on Aug. 17, 2010, which claims priority pursuant to 35 U.S.C. §120, as a continuation, to the following U.S. Utility patent application which is hereby incorporated herein by reference in its entirety and made part of the present U.S. Utility patent application for all purposes:
2. U.S. Utility application Ser. No. 10/609,058, entitled "Symmetrical Clock Distribution in Multi-Stage High Speed Data Conversion Circuits,", filed Jun. 28, 2003, issued as U.S. Pat. No. 7,319,706 on Jan. 15, 2008, which claims priority pursuant to 35 U.S.C. §119(e) to the following U.S. Provisional Patent Application which is hereby incorporated herein by reference in its entirety and made part of the present U.S. Utility patent application for all purposes:
   a. U.S. Provisional Application Ser. No. 60/403,457, entitled, "Signal Delay Structure in High Speed Bit Stream Demultiplexer with Hybrid High-Speed/Low-Speed Output Latch", filed Aug. 12, 2002.

TECHNICAL FIELD

The present invention relates generally to communication systems; and more particularly to high-speed serial bit stream communications.

DESCRIPTION OF RELATED ART

The structure and operation of communication systems is generally well known. Communication systems support the transfer of information from one location to another location. Early examples of communication systems included the telegraph and the public switch telephone network (PSTN). When initially constructed, the PSTN was a circuit switched network that supported only analog voice communications. As the PSTN advanced in its structure and operation, it supported digital communications. The Internet is a more recently developed communication system that supports digital communications. As contrasted to the PSTN, the Internet is a packet switch network.

The Internet consists of a plurality of switch hubs and digital communication lines that interconnect the switch hubs. Many of the digital communication lines of the Internet are serviced via fiber optic cables (media). Fiber optic media supports high-speed communications and provides substantial bandwidth, as compared to copper media. At the switch hubs, switching equipment is used to switch data communications between digital communication lines. WANs, Internet service providers (ISPs), and various other networks access the Internet at these switch hubs. This structure is not unique to the Internet, however. Portions of the PSTN, wireless cellular network infrastructure, Wide Area Networks (WANs), and other communication systems also employ this same structure.

The switch hubs employ switches to route incoming traffic and outgoing traffic. A typical switch located at a switch hub includes a housing having a plurality of slots that are designed to receive Printed Circuit Boards (PCBs) upon which integrated circuits and various media connectors are mounted. The PCBs removably mount within the racks of the housing and typically communicate with one another via a back plane of the housing. Each PCB typically includes at least two media connectors that couple the PCB to a pair of optical cables and/or copper media. The optical and/or copper media serves to couple the PCB to other PCBs located in the same geographic area or to other PCBs located at another geographic area.

For example, a switch that services a building in a large city couples via fiber media to switches mounted in other buildings within the city and switches located in other cities and even in other countries. Typically, Application Specific Integrated Circuits (ASICs) are mounted upon the PCBs of the housing. These ASICs perform switching operations for the data that is received on the coupled media and transmitted on the coupled media. The coupled media typically terminates in a receptacle and transceiving circuitry coupled thereto performs signal conversion operations. In most installations, the media, for example, optical media, operates in a simplex fashion. In such case, one optical media carries incoming data (RX data) to the PCB while another optical media carries outgoing data (TX data) from the PCB. Thus, the transceiving circuitry typically includes incoming circuitry and outgoing circuitry, each of which couples to a media connector on a first side and communicatively couples to the ASIC on a second side. The ASIC may also couple to a back plane interface that allows the ASIC to communicate with other ASICs located in the enclosure via a back plane connection. The ASIC is designed and implemented to provide desired switching operations. The operation of such enclosures and the PCBs mounted therein is generally known.

The conversion of information from the optical media or copper media to a signal that may be received by the ASIC and vice versa requires satisfaction of a number of requirements. First, the coupled physical media has particular RX signal requirements and TX signal requirements. These requirements must be met at the boundary of the connector to the physical media. Further, the ASIC has its own unique RX and TX signal requirements. These requirements must be met at the ASIC interface. Thus, the transceiving circuit that resides between the physical media and the ASIC must satisfy all of these requirements.

Various standardized interfaces have been employed to couple the transceiving circuit to the ASIC. These standardized interfaces include the XAUI interface, the Xenpak interface, the GBIC interface, the XGMII interface, and the SFI-5 interface, among others. The SFI-5 interface, for example, includes 16 data lines, each of which supports a serial bit stream having a nominal bit rate of 2.5 Giga bits-per-second (GBPS). Line interfaces also have their own operational characteristics. Particular high-speed line interfaces are the OC-768 interface and the SEL-768 interface. Each of these interfaces provides a high-speed serial interface operating at a nominal bit rate of 40 GBPS.

Particular difficulties arise in converting data between the 40.times.1 GBPS line interface and the 16.times.2.5 GBPS communication ASIC interface. In particular, operation on the 40 GBPS side requires the ability to switch data at a very high bit rate, for example, exceeding the bit rate possible with a CMOS integrated circuit formed of Silicon. While other materials, for example, Indium-Phosphate and Silicon-Germanium provide higher switching rates than do Silicon based devices, they are very expensive and difficult to manufacture. Further, the functional requirements of interfacing the 40.times.1 GBPS line interface and the 16.times.2.5 GBPS communication ASIC interface are substantial. Thus, even if a device were manufactured that could perform such interfacing operations, the effective yield in an Indium-Phosphate or Silicon-Germanium process would be very low.

Skewing of data and clock signals in high-speed data communications systems running at clock and data rates in the 10 GBPS range can be very difficult to avoid and can adversely impact the integrity of data. Some prior art solutions involved delay schemes that consume power and increase the overall complexity of these circuits. Thus a need exists for a lower power consumption solution that reduces the effect of data and clock skewing.

SUMMARY

The present invention is directed to apparatus and methods of operation that are further described in the following Brief Description of the Drawings, the Detailed Description of the Drawings, and the claims. Other features and advantages of the present invention will become apparent from the following detailed description of the drawings made with reference to the accompanying drawings.

BRIEF DESCRIPTION OF THE DRAWINGS

These and other features, aspects and advantages of the present invention will be more fully understood when considered with respect to the following detailed description, appended claims and accompanying drawings wherein:

FIG. 6 is a table and a diagram that illustrate operating specifications for the RX interface between the RX data demultiplexer circuits of FIG. 3;

FIGS. 15A and 15B are response curves for the tuned delay element amplifier of FIG. 14 with high and optimized Q factors respectively.

DETAILED DESCRIPTION OF THE DRAWINGS

Figure 1:
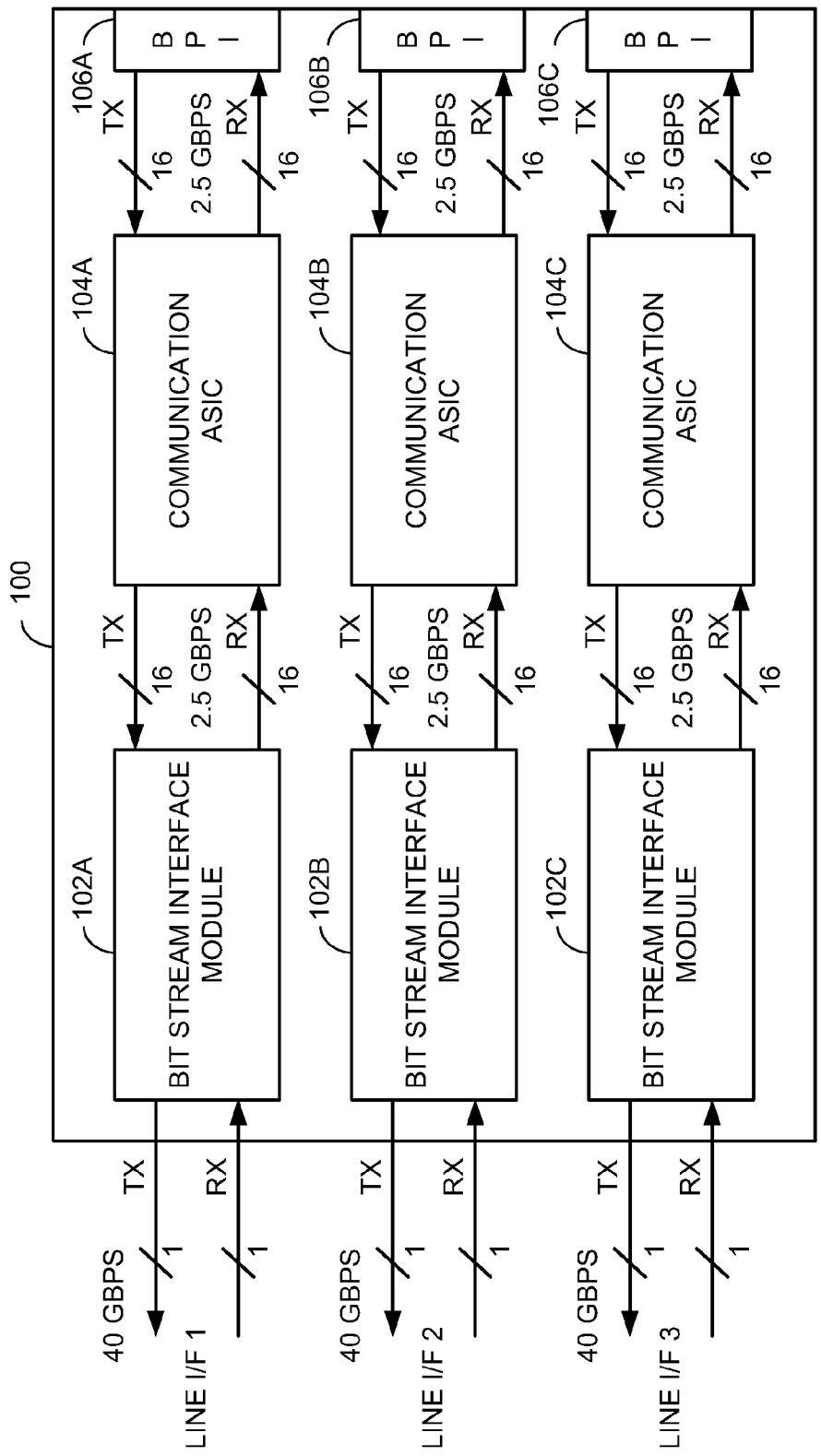
FIG. 1 is a block diagram illustrating a Printed Circuit Board (PCB) that has mounted thereon a plurality of Bit Stream Interface Module (BSIMs) constructed according to the present invention.

Provided is a high-speed data conversion circuit. More specifically, a high-speed data conversion circuit that simultaneously reduces the skewing of clock, data and other like signals, and as well as power consumption.

In one embodiment, a high-speed data conversion circuit includes a first set of input ports that receive bit streams at a first bit rate. Data circuit paired pathways transport these bit streams from the input ports to data conversion circuits (multiplexers or demultiplexers). The transmission time for the bit streams on the various data circuit paired pathways are substantially equal to prevent or reduce skewing of the bit streams. A clock distribution circuit receives a data clock signal at a clock port located approximately midway within the set of input ports. The clock circuit then distributes the data clock signal to the individual data conversion circuits along approximately symmetrical clock circuit pathways. Symmetrical may be understood as having approximately equal transmission times. In addition, the pathways may appear geometrically symmetrical. A central trunk, located between a first pair of data circuit pathways, couples the clock port to symmetrical branches that link the clock signal to the data conversion circuits. The trunk, located between a first pair of data circuit pathways, has symmetrical branches that extend from the trunk and couple to additional branches or the data conversion circuits. The clock transmission times associates with each clock circuit pathway are substantially equal, and the distributed clock signal latches data in the data conversion circuits from the first bit streams to the second bit streams. The paired pathways each have a first pathway located on a first side of the trunk and a second pathway located on a second, opposite, side of the trunk.

The clock distribution circuit may further include delay elements operable to compensate for skewing of the data clock signal received by each data conversion circuit. The delay elements may be made up of switched capacitor networks that introduce delay increments based on a capacitance coupled to a buffer amplifier. The capacitance coupled to the buffer amplifier may be a variable capacitance that may increase or decrease buffer amplifier delay time. Additionally, the circuit may include a retimer to ensure data integrity between the first set of bit streams and the second bit streams. The physical length of each symmetrical data circuit pathways is substantially equal, and the physical length of each symmetrical clock circuit pathways is substantially equal.

This configuration allows power consumption by delay elements, buffer amplifiers, and data converters to be reduced.

The data conversion circuit may serve as a multiplexer, wherein a number of first bit steams exceeds a number of second bit streams, and wherein the second bit rate exceeds the first bit rate. In one embodiment, the first bit streams include 4 bit streams at a bit rate of about 10 GBPS, and wherein the second bit stream comprises 1 bit stream at a bit rate of about 40 GBPS. Another embodiment receives 16 first bit streams at a bit rate of about 2.5 GBPS, and produces 4 bit streams at about 10 GBPS.

Another embodiment provides a method of converting high-speed data bit streams from a first bit rate to a second bit rate, wherein the first and second bit (data) rate differ. This method includes the steps of receiving a first set of bit streams at a first set of input ports. The first set of bit streams is then distributed to a plurality of data conversion circuits along symmetrical data circuit pathways. A plurality of symmetrical clock circuit pathways distributes a clock signal to the data conversion circuits, wherein the clock transmission times associated with each clock circuit pathway are substantially equal.

Data conversion circuits use the distributed clock signal to latch data from the first bit stream to produce the second bit stream. To ensure substantially equal transmission times, delay elements delay the distributed clock signal within individual symmetrical clock circuit pathways to compensate for skewing of the data clock signal provided to each data conversion circuit. Similarly, data may be retimed prior to the individual data conversion circuits to compensate for skewing of data within the first bit streams received by each data conversion circuit. Delay elements, such as switched capacitor networks, may be used to delay the distributed clock signal within individual clock circuit pathways. Similarly, the retiming data circuits may utilize delay elements such as switched capacitor networks. In either case, the switched capacitor networks provide controlled variable capacitance(s). The transmission timers along the various circuit pathways may be equalized through the physical length of each symmetrical data circuit pathway and the physical length of each symmetrical clock circuit pathway.

The method provided by the present invention may get multiplex or demultiplex data from the first bit streams to the second bit streams. In one multiplexing embodiment, the first bit streams include 4 bit streams at about 10 GBPS, and the second bit streams consists of 1 bit stream at about 40 GBPS. Another multiplexing embodiment provides the first bit streams at about 2.5 GBPS and 4-second bit streams at about 10 GBPS.

A third embodiment provides a multistage bit stream multiplexer. This embodiment includes a first multiplexing integrated circuit that receives a first set of bit streams at a first bit rate and that produces a second set of bit streams at a second bit rate. The first set of bit streams are greater in number than the second set of bit streams are in number, and the first bit rate is less than the second bit rate. A clock circuit, generates a forward data clock. Symmetrical data circuit pathways transport the second set of bit streams from the first multiplexing integrated circuit.

A second multiplexing integrated circuit receives the second bit streams from the symmetrical data pathways, wherein the transmission time(s) on the symmetrical data circuit pathways are substantially equal. The second multiplexing integrated circuit receives the forward data clock and symmetrically distributes the forward data clock signal along symmetrical clock circuit pathways, wherein clock transmission times associated with each clock circuit pathway are substantially equal. The distributed data clock signal latches data from the second plurality of bit streams to produce a high-speed bit stream. The symmetrical clock and data circuit pathways may further include delay elements that compensate for skewing of the forward data clock signal.

The delay elements include switched capacitor networks that introduce delay increments based on a capacitance coupled to a buffer amplifier, wherein the capacitance may be a variable capacitance. Additionally, retimers in the data circuit pathways ensure data integrity between the second bit streams and the high-speed bit stream.

FIG. 1 is a block diagram illustrating a Printed Circuit Board (PCB) that has mounted thereon a plurality of Bit Stream Interface Module (BSIMs) constructed according to the present invention. As shown in FIG. 1, the PCB 100 includes BSIMs 102A, 102B and 102C. The PCB 100 also includes mounted thereupon communication Application Specific Integrated Circuits (ASIC) 104A, 104B, and 104C. The PCB 100 is mounted within a housing that services switching requirements within a particular location or geographic area. Each of the BSIMs 102A, 102B, and 102C couples to a high-speed media such as an optical fiber via a respective media interface and supports the OC-768 or the SEC-768 standard at such media interface. On the second side of the BSIMs 102A through 102C, the SFI-5 interface standard is supported. Communication ASIC 104A through 104C may communicate with other PCB components located in the housing via back interfaces 106A through 106C.

The BSIMs 102A through 102C may be removably mounted upon the PCB 100. In such case, if one of the BSIMs 102A through 102C fails it may be removed and replaced without disrupting operation of other devices on the PCB 100. When the BSIMs 102A-102C are removably mounted upon the PCB 100, they are received by a socket or connection coupled to the PCB 100. Further, in such embodiment, the BSIMs 102A-102C may be constructed on a separate PCB.

Figure 2A:
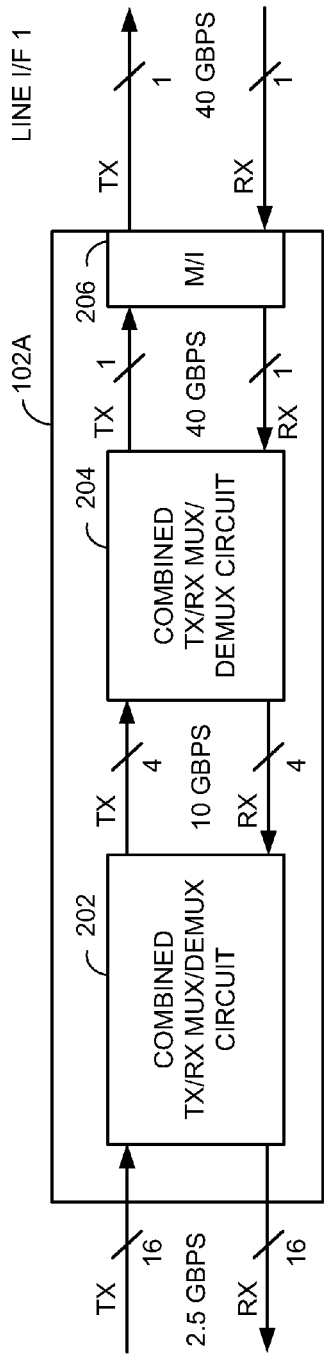
FIG. 2A is a block diagram illustrating one embodiment of a BSIM constructed according to the present invention.

FIG. 2A is a block diagram illustrating one embodiment of a BSIM 102A constructed according to the present invention. The BSIM 102A of FIG. 2A includes a first combined TX/RX multiplexer/demultiplexer circuit 202 and a second combined TX/RX multiplexer/demultiplexer circuit 204. On the line side of the BSIM 102A, the second combined TX/RX multiplexer/demultiplexer circuit 204 couples to a media, for example, fiber optic cable or copper cable, via a media interface 206. The media interface 206 couples to the second combined TX/RX multiplexer/demultiplexer circuit 204 via a 40 GPS nominal bit rate, one bit transmit and one bit receive interface. The TX and RX line medias themselves each (port one bit 40 Giga-bits-per-second (GBPS) nominal bit rate communications, such as is defined by the OC-768 and/or SEC 768 specifications of the Optical Internetworking Forum (OIF).

The combined TX/RX multiplexer/demultiplexer circuit 202 interfaces with a communication ASIC, for example, 104A, via 16 TX bit lines and 16 RX bit lines, each operating at a nominal bit rate of 2.5 GBPS. Such interface supports a nominal total throughput of 40 GBPS (16×2.5 GBPS). The interface between the combined TX/RX multiplexer/demultiplexer circuit 202 and the combined TX/RX multiplexer/demultiplexer circuit 204 includes 4 TX bit lines and 4 RX bit lines, each operating at a nominal rate of 10 GBPS. This interface supports a nominal total throughput of 40 GBPS (4×10 GBPS). This interface may operate substantially or fully in accordance with an operating standard known as the Q40 operating standard. However, the teachings of the present invention are not limited to according to operation of the Q40 standard or is the description here intended to be a complete description of the Q40 standard itself.

Figure 2B:
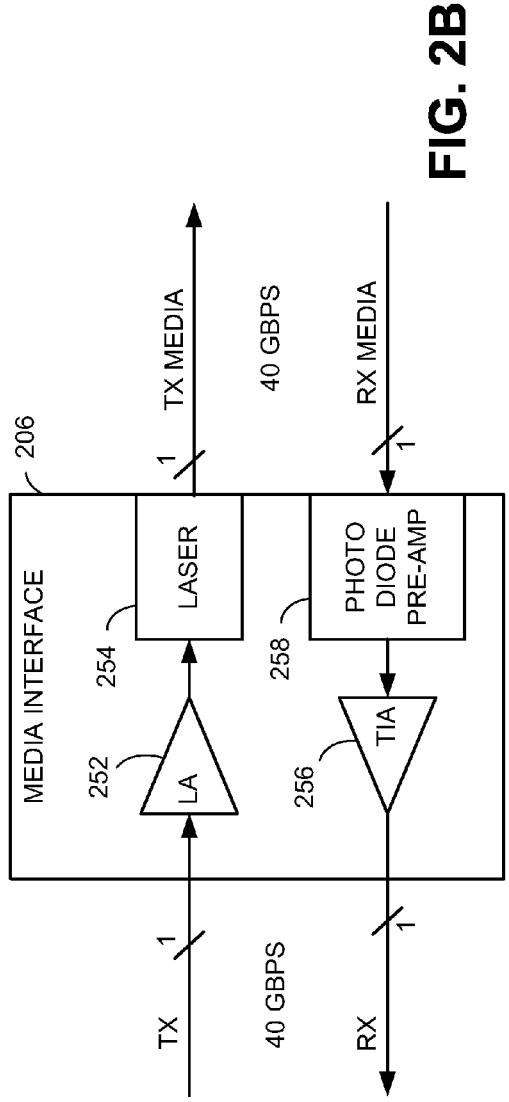
FIG. 2B is a block diagram illustrating an optical media interface that may be included with the BSIM of FIG. 2A.

FIG. 2B is a block diagram illustrating an optical media interface that may be included with the BSIM of FIG. 2A. As shown in FIG. 2B, media interface 206 couples to an optical media on a first side and couples to the combined TX/RX multiplexer/demultiplexer circuit 204 on a second side. In the transmit path, the media interface 206 receives a single bit stream at a nominal bit rate of 40 GBPS from the combined TX/RX multiplexer/demultiplexer circuit 204. The TX bit stream is amplified by limiting amplifier 252 to produce a bit stream output that is coupled to laser 254. The laser produces an optical signal that is coupled to TX optical media.

On the receive side, an RX optical media produces the RX bit stream at a nominal bit rate of 40 GBPS. The RX bit stream is received by a photo diode/pre-amplifier combination 258. The photo diode/pre-amplifier combination 258 produces an output that is received by a transimpedance amplifier 256. The output of the transimpedance amplifier 256 is a single bit stream at a nominal bit rate of 40 GBPS that is provided to the combined TX/RX multiplexer/demultiplexer circuit 204 of FIG. 2A.

Figure 3:
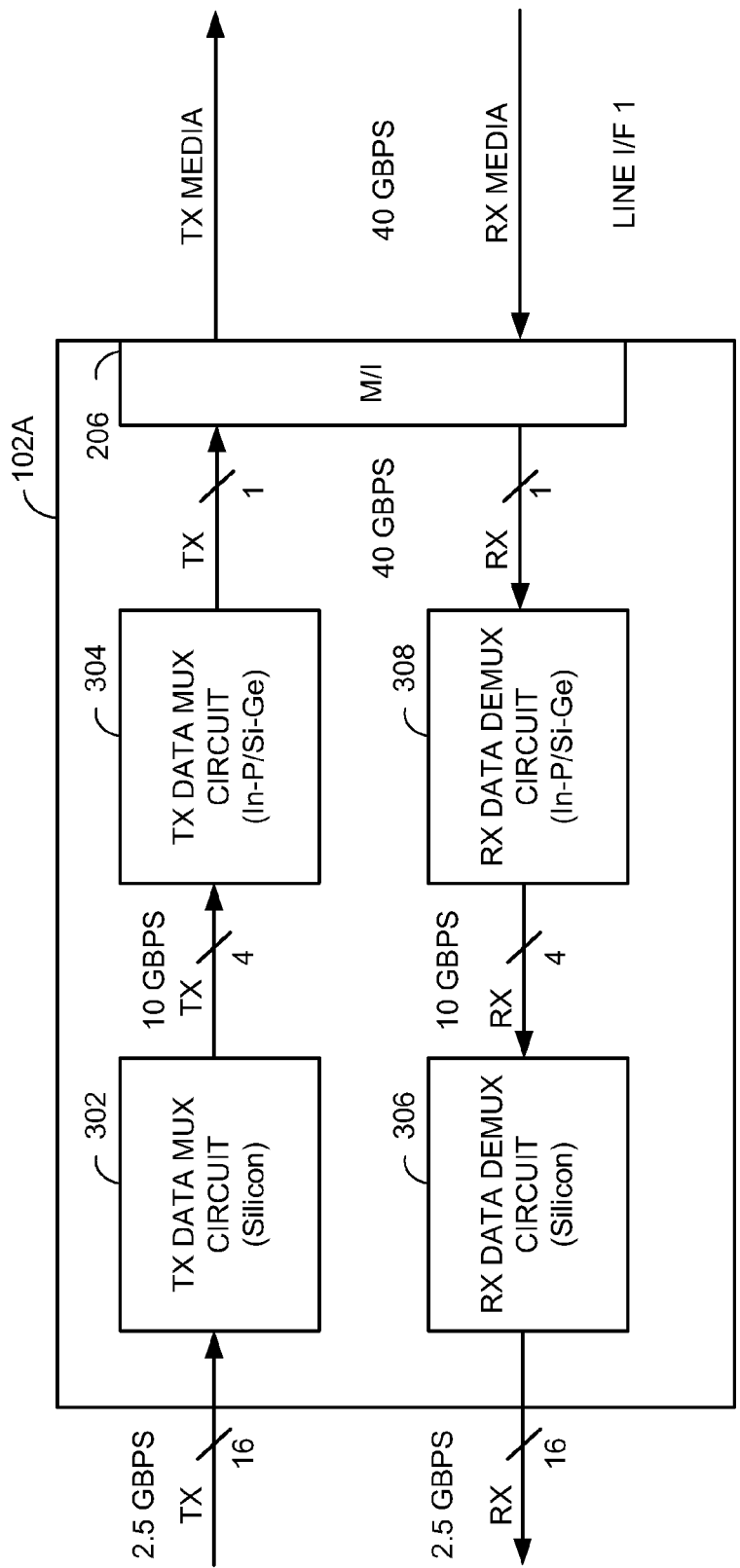
FIG. 3 is a block diagram illustrating another embodiment of a BSIM constructed according to the present invention.

FIG. 3 is a block diagram illustrating another embodiment of a BSIM constructed according to the present invention. The embodiment of FIG. 3 differs from the embodiment of FIG. 2A in that separate TX and RX circuit components are employed. While the media interface 206 of FIG. 3 is shown to be a single device such as shown in FIG. 2B, in other embodiments, the media interface 206 may be formed in separate circuits corresponding to the separate TX and RX paths shown in FIG. 2B.

In the TX path, TX data multiplexer circuit 302 receives a 16 bit wide by 2.5 GBPS nominal bit rate input from a coupled ASIC and produces a 4 bit wide×10 GBPS nominal bit rate TX output. In the embodiment described herein, the TX data multiplexer circuit 302 is constructed in a Silicon CMOS process, for example in a 0.13 micron CMOS process. The TX data multiplexer circuit 302 multiplexes the 16 bit wide by 2.5 GBPS nominal bit rate input to produce a 4 bit wide 10 GBPS nominal bit rate output, which is received by the TX data multiplexer circuit 304. The TX data multiplexer circuit 304 multiplexes the 4 bit wide×10 GBPS nominal bit rate output to produce a single bit wide output at a nominal bit rate of 40 GBPS.

The TX data multiplexer circuit 304 must switch at a frequency that is at least four times the rate at which the TX data multiplexer circuit 302 must switch. For this reason, the TX data multiplexer circuit 304 is constructed in an Indium-Phosphate process or in a Silicon-Germanium process. Each of these processes supports the higher switching rates required at the 40 GBPS output of the TX data multiplexer circuit 304. Thus in combination the TX data multiplexer circuit 302 constructed in a CMOS process and the TX data multiplexer circuit 304 constructed in an Indium-Phosphate or Silicon-Germanium process will provide a high performance relatively low cost solution to the interfacing of a 2.5 GBPS nominal bit rate 16 bit wide interface and a 40 GBPS 1 bit wide interface.

Likewise, in the RX path, the bit stream interface module 102A includes an RX data demultiplexer circuit 308 that receives a single bit stream at a nominal bit rate of 40 GBPS data. The RX data demultiplexer circuit 308 produces a 4 bit wide.times.10 GBPS nominal bit rate output. The RX data demultiplexer circuit 306 receives the 4 bit wide×10 GBPS nominal bit rate output and produces a 16 bit wide.times.2.5 GBPS nominal bit rate receive data stream.

As was the case with the TX data multiplexer circuit 302 and the TX data multiplexer circuit 304, the RX data demultiplexer circuit 306 and the RX data demultiplexer circuit 308 are formed in differing process types. In particular the RX data demultiplexer circuit 306 is constructed in a Silicon CMOS process. Further, the RX data demultiplexer circuit 308 is constructed in an Indium-Phosphate or Silicon-Germanium process so that the RX demultiplexer circuit 308 will support the higher switching speeds of the 1 bit wide×40 GBPS interface to the media interface 206.

Figure 4A:
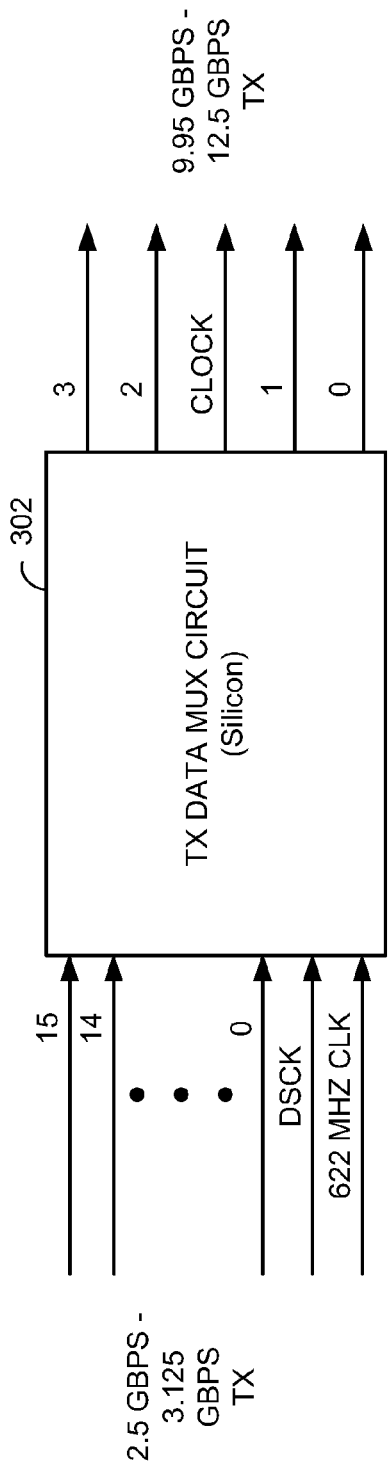
FIG. 4A is a block diagram illustrating a TX data multiplexer circuit constructed according to the present invention.

FIG. 4A is a block diagram illustrating a TX data multiplexer circuit constructed according to the present invention. As shown in FIG. 4A, the TX data multiplexer circuit 302 receives 16 bit steams of data at nominal bit rate of 2.5 GBPS on each bit line from the communication ASIC 104A. Each bit line of this 16 bit wide interface however can operate at bit rates of up to 3.125 GBPS. This interface also includes a DSCK clock and 622 MHz clock. The output of the TX data multiplexer circuit 302 includes 4 bit lines, each of which supports a nominal bit rate of 10 GBPS. However, the output of the TX data multiplexer circuit can produce data at bit rates of between 9.95 GBPS and 12.5 GBPS. The TX data multiplexer circuit 302 also produces a clock signal at one-half the nominal bit rate of the 4 bit stream paths. In such case, when the nominal bit rate of the data paths is 10 GBPS, the clock will be produced at 5 GHz.

Figure 4B:
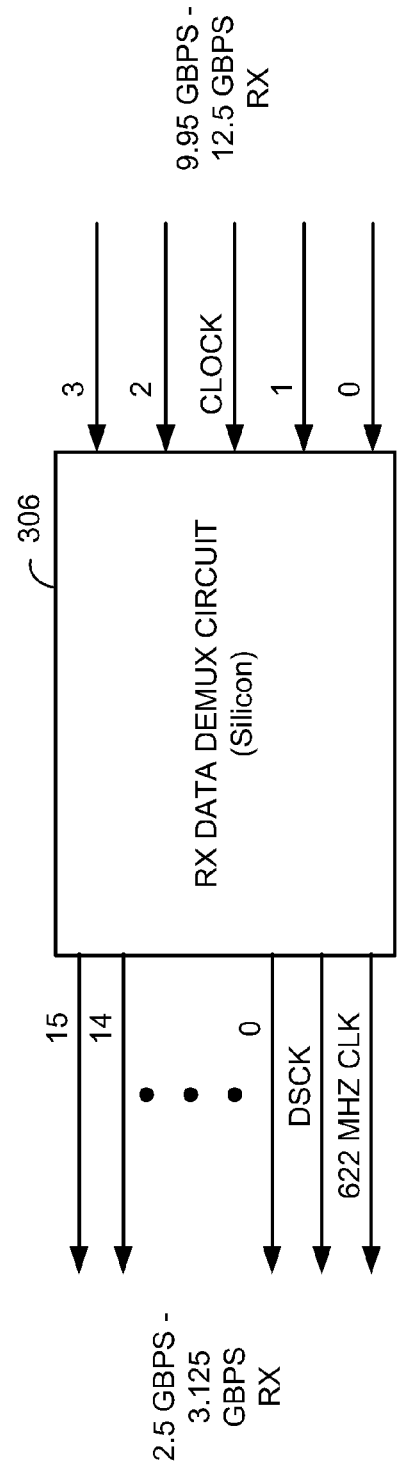
FIG. 4B is a block diagram illustrating an RX data demultiplexer circuit constructed according to the present invention.

FIG. 4B is a block diagram illustrating an RX data demultiplexer circuit 306 constructed according to the present invention. As shown in FIG. 4B, the RX data demultiplexer circuit 306 receives 4 bit streams at nominal bit rates of 10 GBPS each but may operate in the range of 9.95 GBPS to 12.5 GBPS. The RX data demultiplexer circuit 306 produces 16 bit stream outputs at a nominal bit rate of 2.25 GBPS. However, the RX data demultiplexer circuit 306 may produce the 16 bit streams output at a bit rate of between 2.5 GBPS and 3.125 GBPS.

Figure 5:
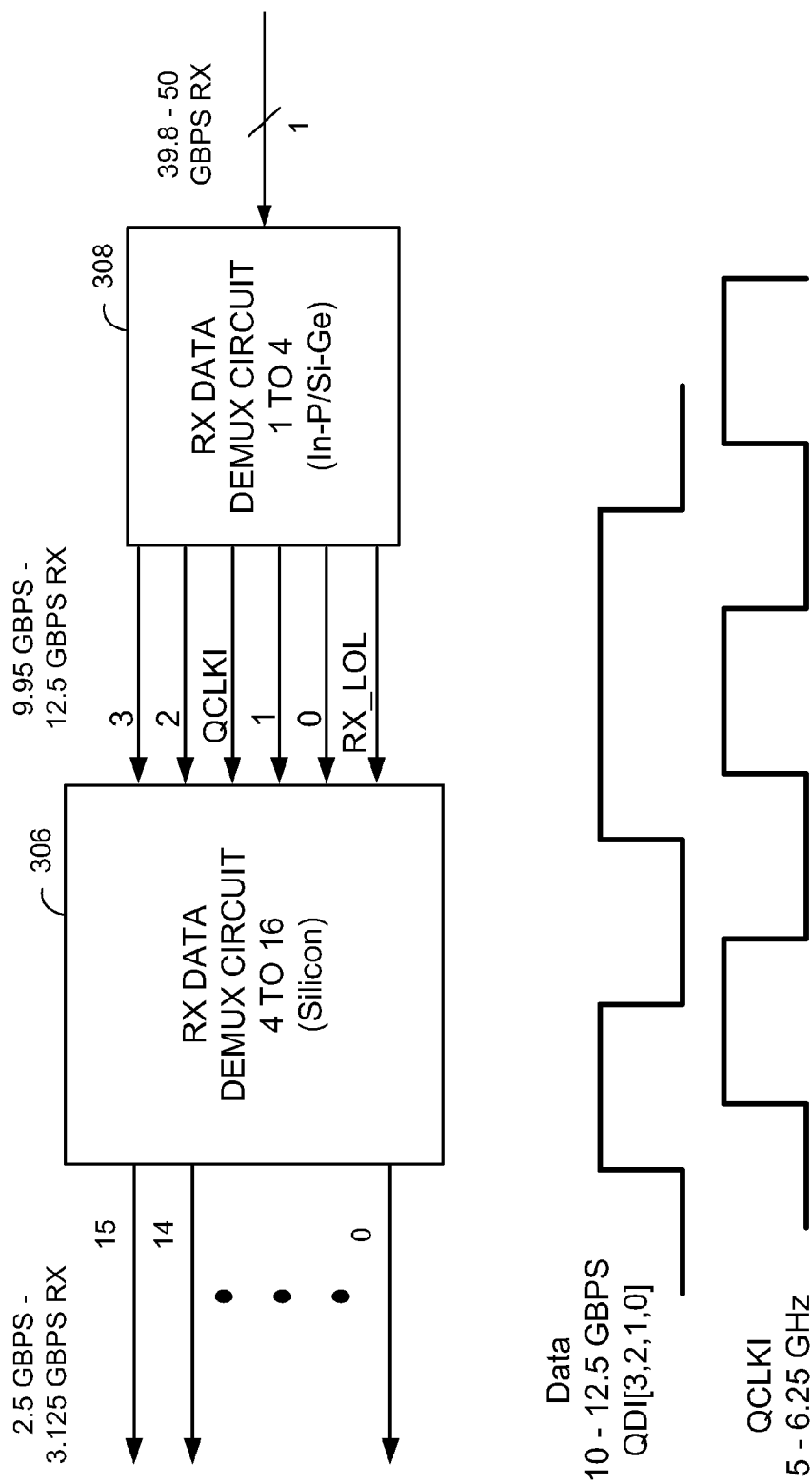
FIG. 5 is a block diagram illustrating the RX data demultiplexer circuits of FIG. 3 and the interfaces serviced thereby.

FIG. 5 is a block diagram illustrating the RX data demultiplexer circuits 306 and 308 of FIG. 3 and the interfaces serviced thereby. As is shown in FIG. 5, the RX data demultiplexer circuit 308 receives a single bit stream at a nominal bit rate of 40 GBPS. However, the single bit stream input may operate at bit rates from between 39.8 GBPS and 50 GBPS. The RX data demultiplexer circuit performs a 1 to 4 demultiplexing operation on the received single bit stream to produce 4 output bit streams at a nominal bit rate of 10 GBPS. However, the RX data demultiplexer circuit 308 may also produce output at bit rates from 9.95 GBPS to 12.5 GBPS.

The RX data demultiplexer circuit 306 receives the 4 bit streams having nominal bit rates of 10 GBPS each and a QCLKI signal and a RX_LOL signal from the RX data demultiplexer circuit 308. Based upon these input signals, the RX data demultiplexer circuit 306 produces the 16 bit stream outputs at nominal bit rates of 2.5 GBPS. Also shown in FIG. 5, the QCLKI signal operates at one-half the frequency of the bit rate of the data stream received from the RX data demultiplexer circuit 308. Thus, in such case, for the nominal bit rate of 10 GBPS, the QCLKI signal will be provided at 5 GHz.

Skewing often occurs because the clock and data are both generated externally to the RX data demultiplexer circuit 306, and because the data and clock signals must travel over PC board traces that likely will have varying lengths and therefore varying parasitic loads. Skewing occurs between the clock QCLKI and data the 4 bit streams generated by InP circuit 308. Given the high speed at which these inputs operate, there is very little room for delay caused by mismatches between the clock and data signals. Without a signal delay method and structure the clock data relationship cannot be guaranteed to comport with the specifications established for that relationship. Further, because each of the data paths is unique across the PCB, it is highly likely that, even though the RX data demultiplexer circuit 308 produces data that is aligned upon transmission, the data will not be aligned upon receipt by the RX data demultiplexer circuit 306.

FIG. 6 includes a table and a diagram that illustrate operating specifications for the RX interface between the RX data demultiplexer circuits 308 and 306 of FIG. 3. As shown in FIG. 6, the receiver input parameters are shown at 400 and an equivalent circuit thereupon is shown at 402.

Figure 7:
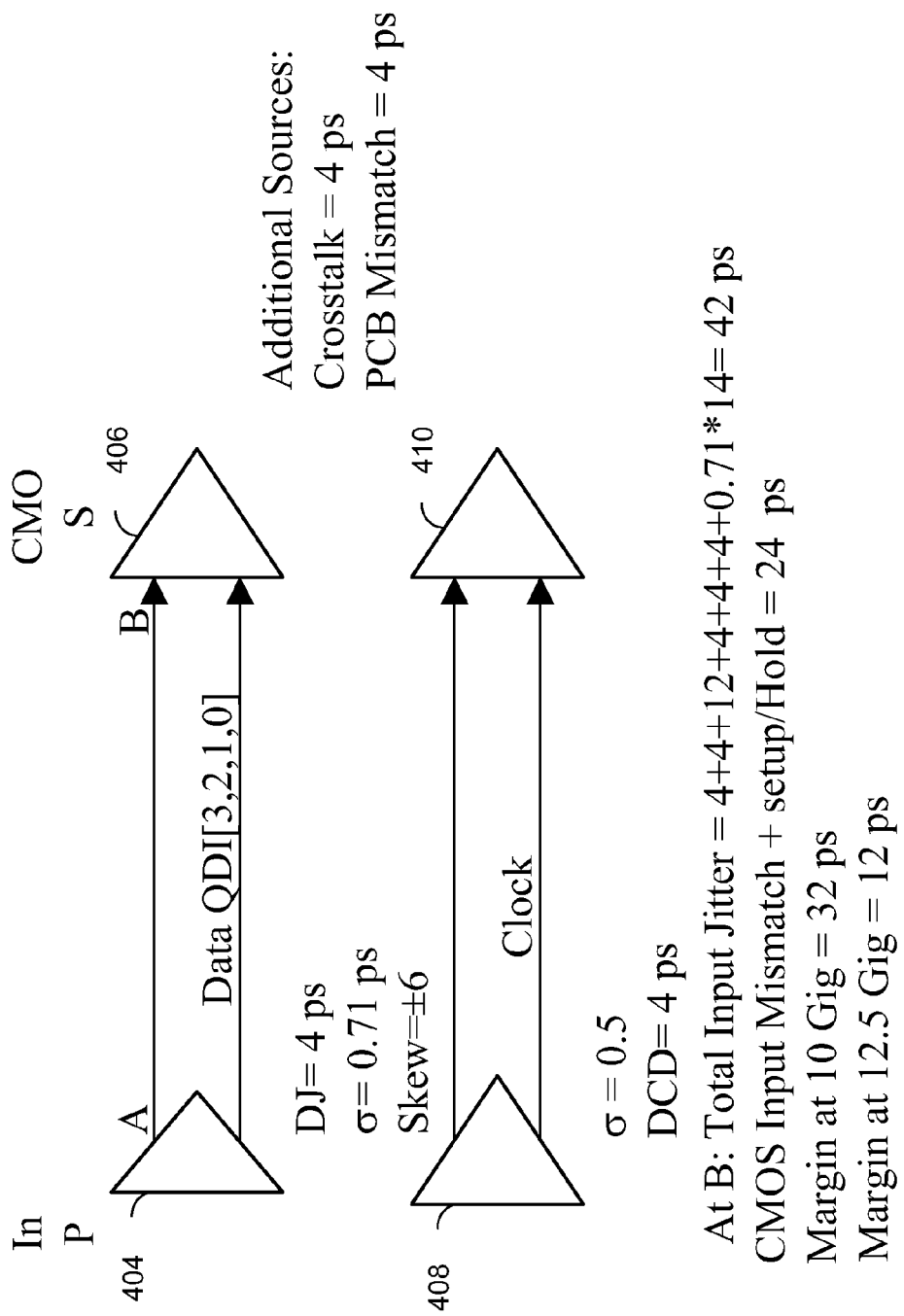
FIG. 7 is a block diagram illustrating the jitter allocation for the RX link between RX data multiplexer circuits of FIG. 3.

FIG. 7 provides a block diagram illustrating the jitter allocation for the RX link between RX data demultiplexer circuits 308 and 306 of FIG. 3. One of four data differential data line drivers 404 of the RX data demultiplexer circuit 308 and a differential clock driver 408 of the RX data demultiplexer circuit 308 on the 4 bit stream 10 GBPS side are shown. FIG. 7 also shows one of four data input buffers 406 of the RX data demultiplexer circuit 306 and a clock input buffer 410 of the RX data demultiplexer circuit 306. As is indicated, deterministic jitter for the data interface is specified as a maximum of 8 picoseconds. Further, the skew or non-deterministic jitter in the data lines is limited to +/−8 picoseconds. The additional information provided in FIG. 7 shows how these jitters may be summed to result in maximum jitters.

Figure 8:
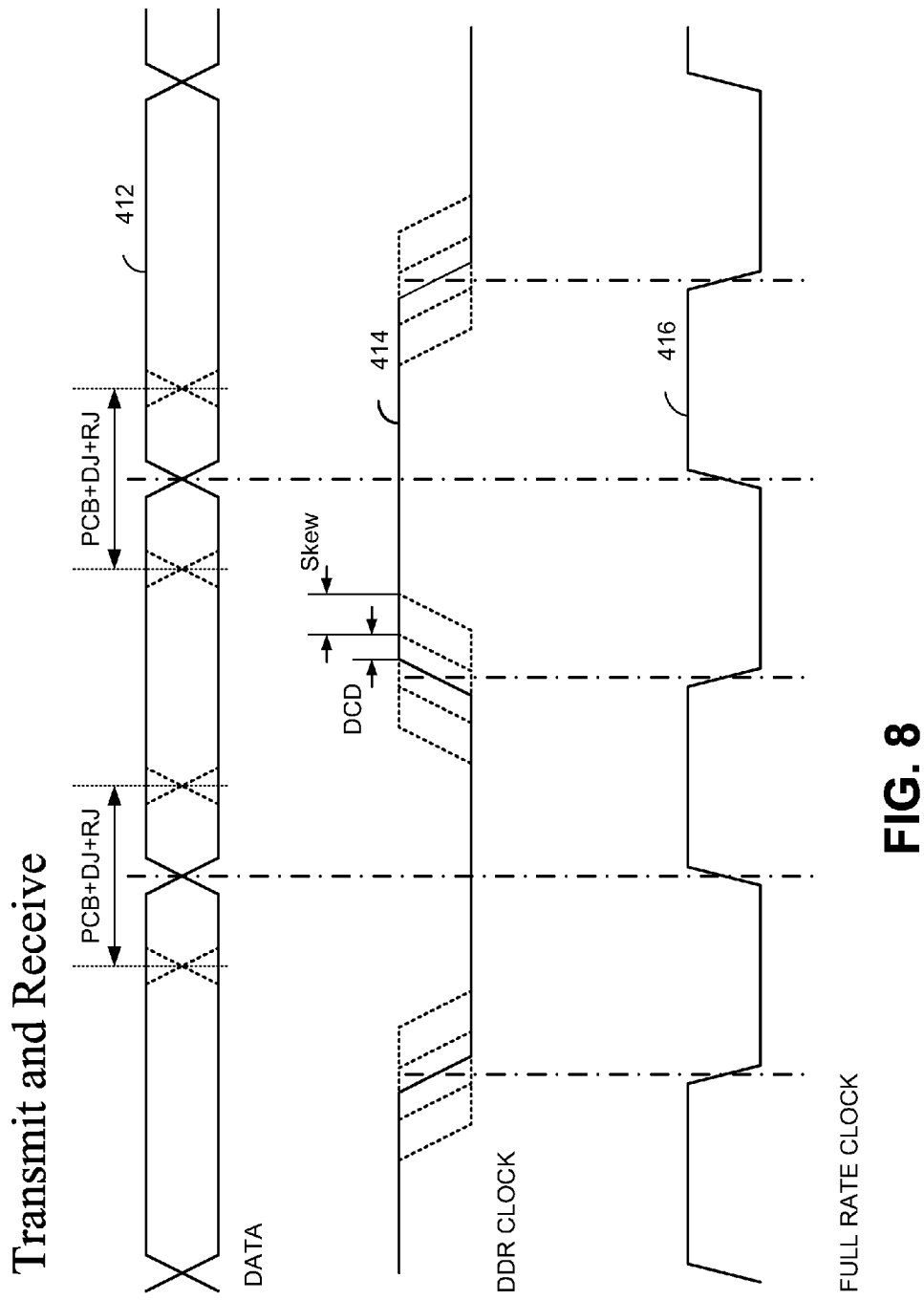
FIG. 8 includes timing diagrams illustrating the set up and hold operations on the 4 bit wide.times.10 GBPS links between the RX data demultiplexer circuits of FIG. 3.

FIG. 8 provides a timing diagram illustrating the set up and hold operations on the 4 bit×10 GBPS links between the TX data demultiplexer integrated circuits 306 and 308 of FIG. 3. In particular, the diagram illustrates the jitter relationships and definitions of the data 412, the DDR clock 414 and a full rate clock 416.

Figure 9:
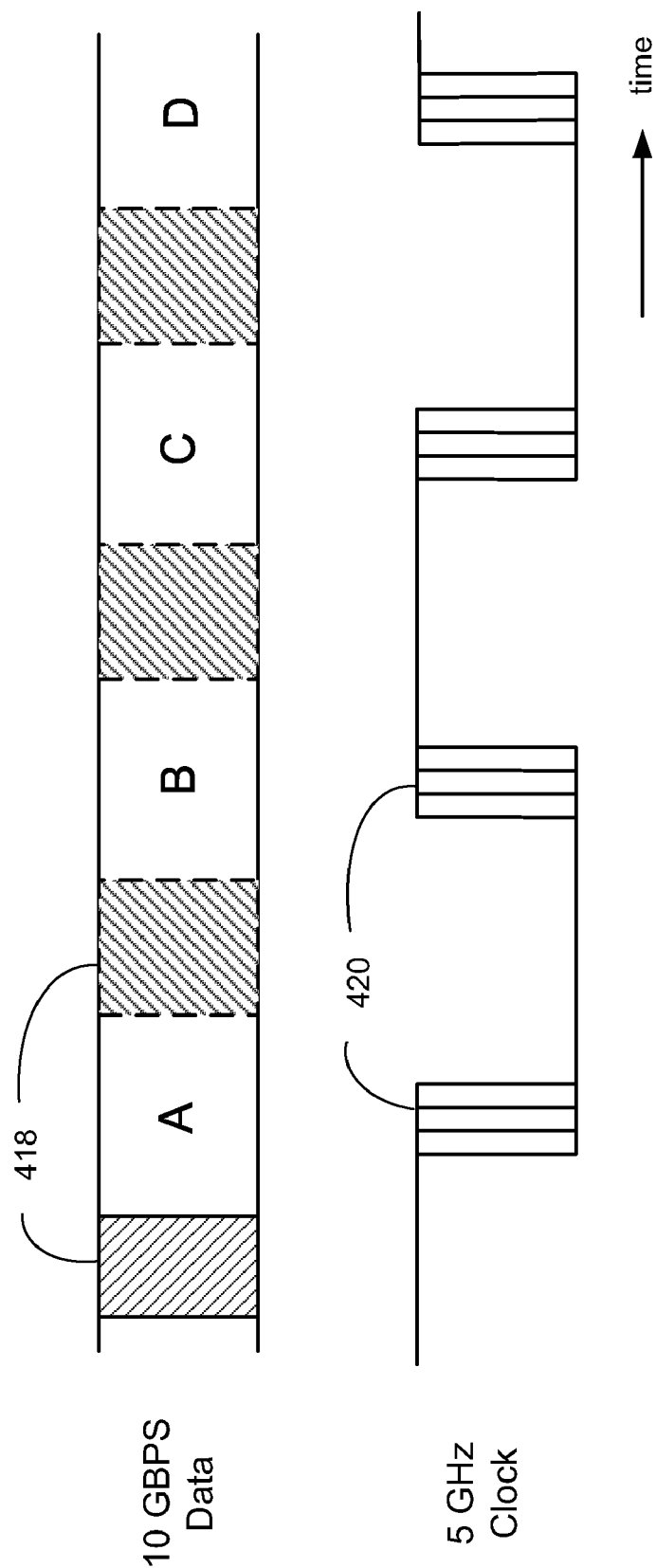
FIG. 9 provides an illustration of the jitter that can be experienced by the four 10 GPBS data inputs in relation to the jitter experienced by the 5 GHz clock input between the RX data demultiplexer circuits of FIG. 3.

FIG. 9 illustrates jitter that can be experienced by the four 10 GPBS data inputs in relation to jitter experienced by the 5 GHz clock input to the RX data demultiplexer circuit 306. Because of this jitter, there is little or no room for error regarding the skewing that can be permitted to occur between the clock arriving at the various demultiplexers of the RX data demultiplexer circuit 306 and the data that is to be demultiplexed by the RX data demultiplexer circuit 306. Given the amount of jitter 418 that can occur on the data, in combination with the jitter 420 that can occur on the clock, and the frequency at which the clock and data are switching, there is very little guaranteed open window during which the data can be latched.

Figure 10A:
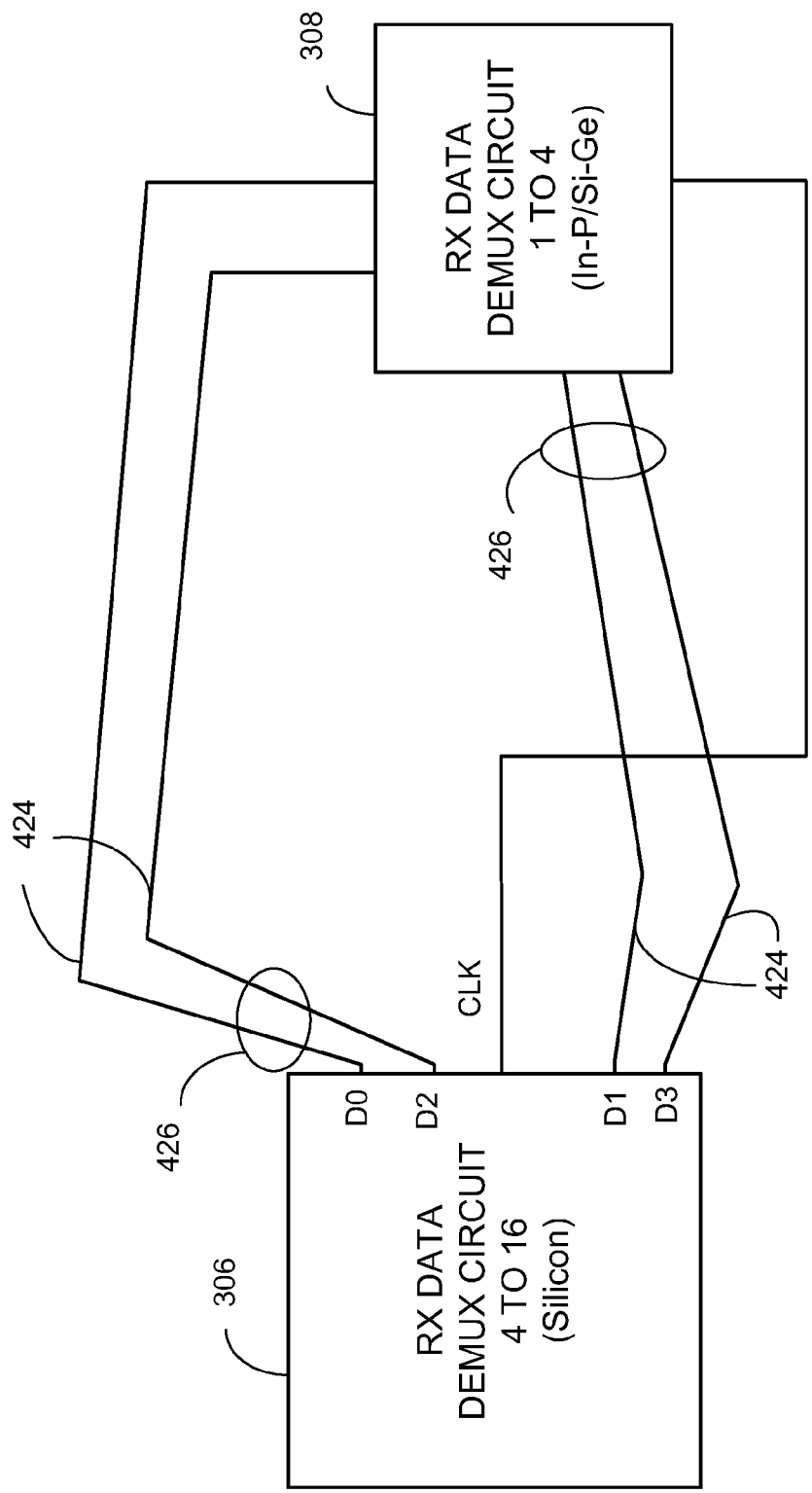
FIGS. 10A-10C illustrate how significant skew can accumulate between signals on the various data lines and the clock lines forming the interface between data conversion circuits.

FIG. 10A illustrates how significant skew can accumulate between signals on the various data lines and the clock lines forming the interface between the RX data demultiplexer circuits 306 and 308 of FIG. 3. The skew can result from varying trace lengths of the individual data lines 424 as well as variations between the length of various pairs of individual traces 426 with respect to one another. These differences can result from package mounting variations between the various pads due to wire bond locations as well as wire bond lengths. Other sources of skewing result from (1) the generation of the clock and data by the InP circuit 308 and the mismatches in phase and frequency that originate with the generation of those signals; and (2) the parasitic loads from the traces running on the PC boards (and variations thereof).

Figure 10B:
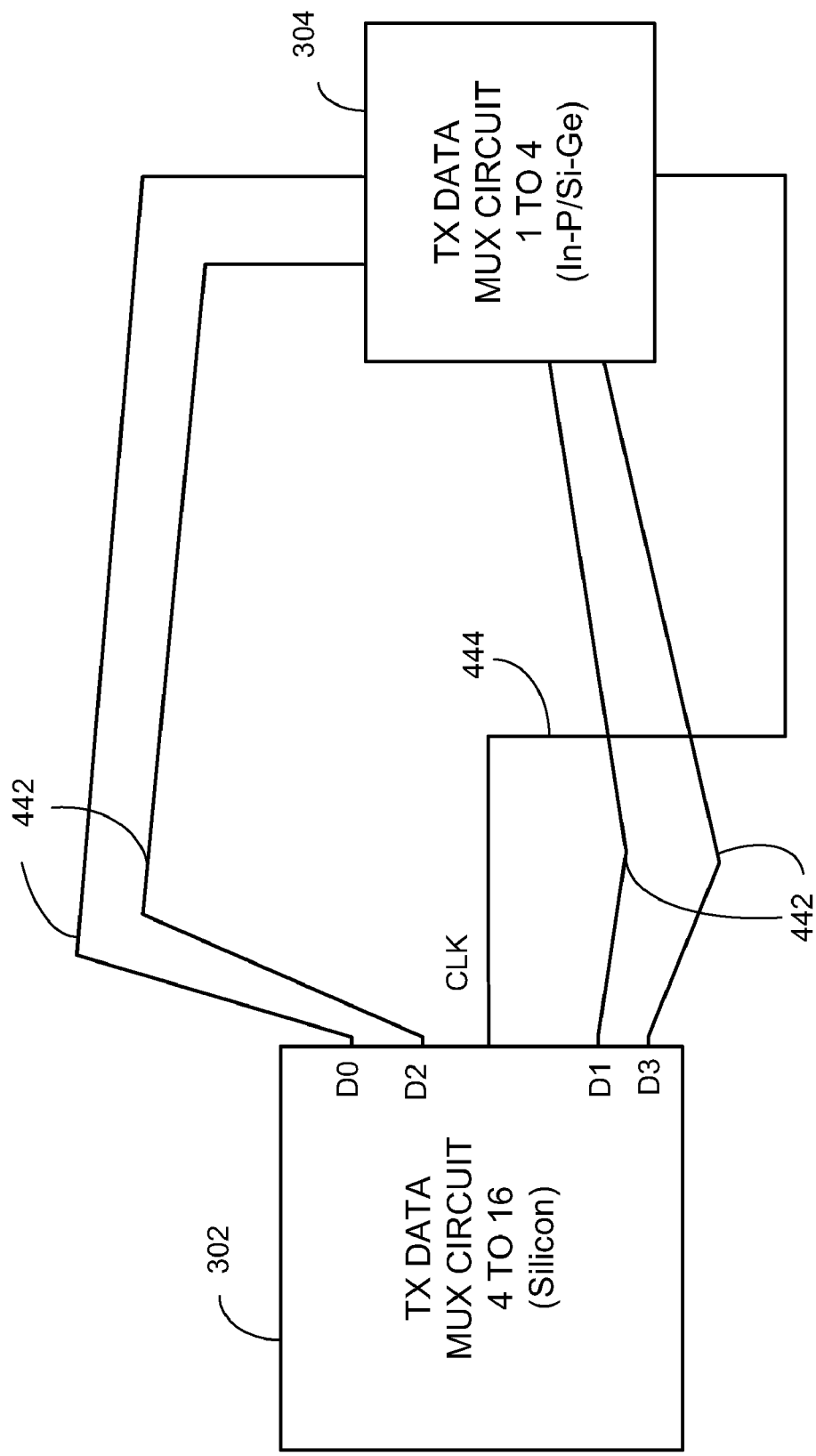

Similarly, FIG. 10B illustrates how significant skew may accumulate between signals on various data pathways 442 and clock pathway 444 within the interface between TX data multiplexer circuits 302 and 304 of FIG. 3. This skew can also result from varying trace lengths of the individual data pathways 442 as well as variations between the length of various pairs of individual pathways with respect to one another. These differences can also result from package mounting variations between the various paths due to wire bond locations as well as wire bond length. Other sources of skewing result from the generation of the clock and data by circuits 302 and 304 and the mismatches in phase and frequency that originate with the generation of those signals.

Figure 10C:
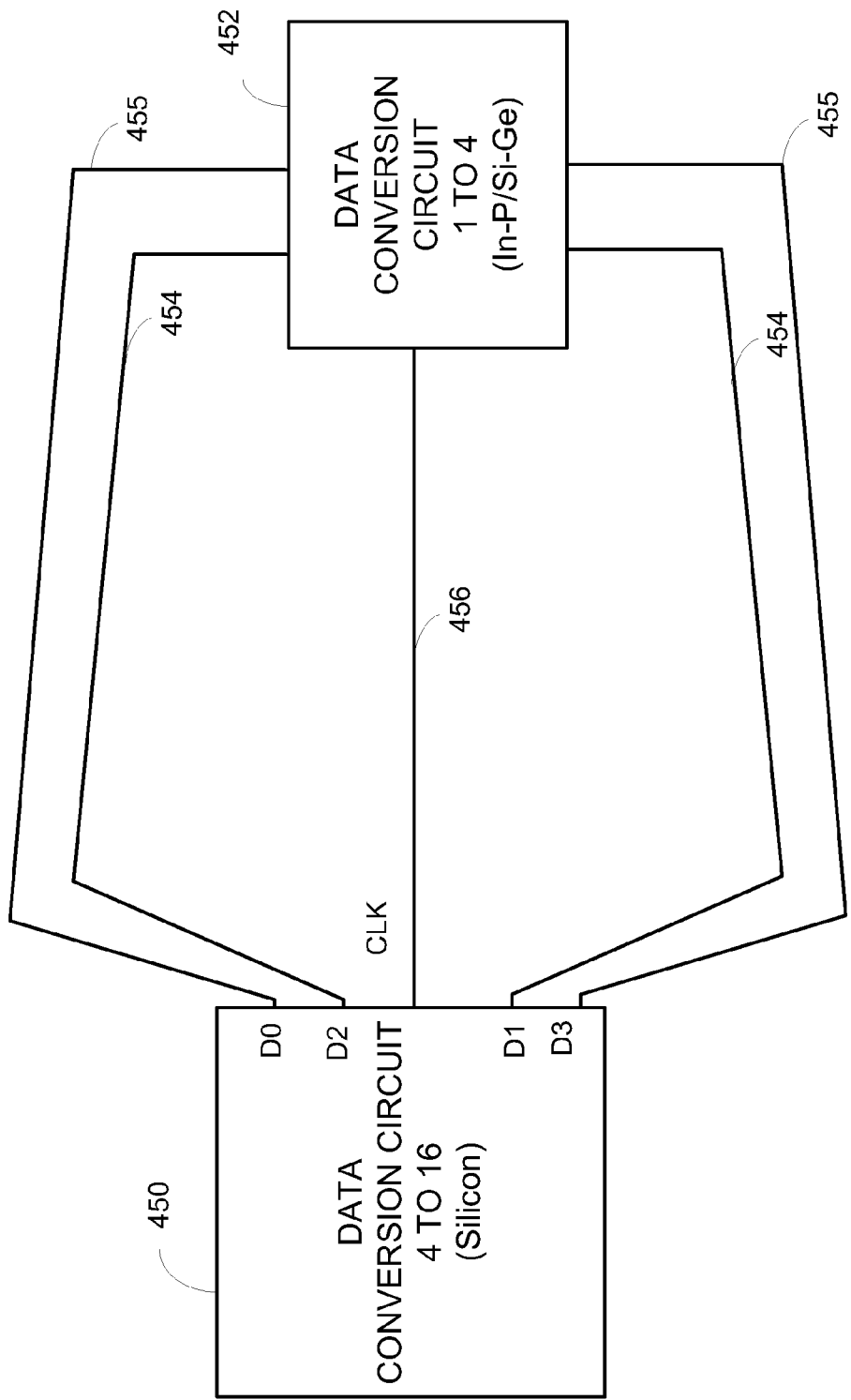

FIG. 10C illustrates that skewing of signals on various data pathways 454 and 455, as well as clock pathway 456, between data conversation circuits 450 and 452, can be reduced with circuit pathways 454, 455 and 456 having substantially equal transmission times (and corresponding transmission lengths). This minimizes variations due to circuit pathway lengths. As shown in FIG. 10C, circuit pathways 454 and 455 are geometrically symmetrical about clock pathway 456. Thus, minimizing skewing can be achieved by physically configuring the circuit pathways, implementing delay elements within the circuit pathways or a combination of the two.

Figure 11A:
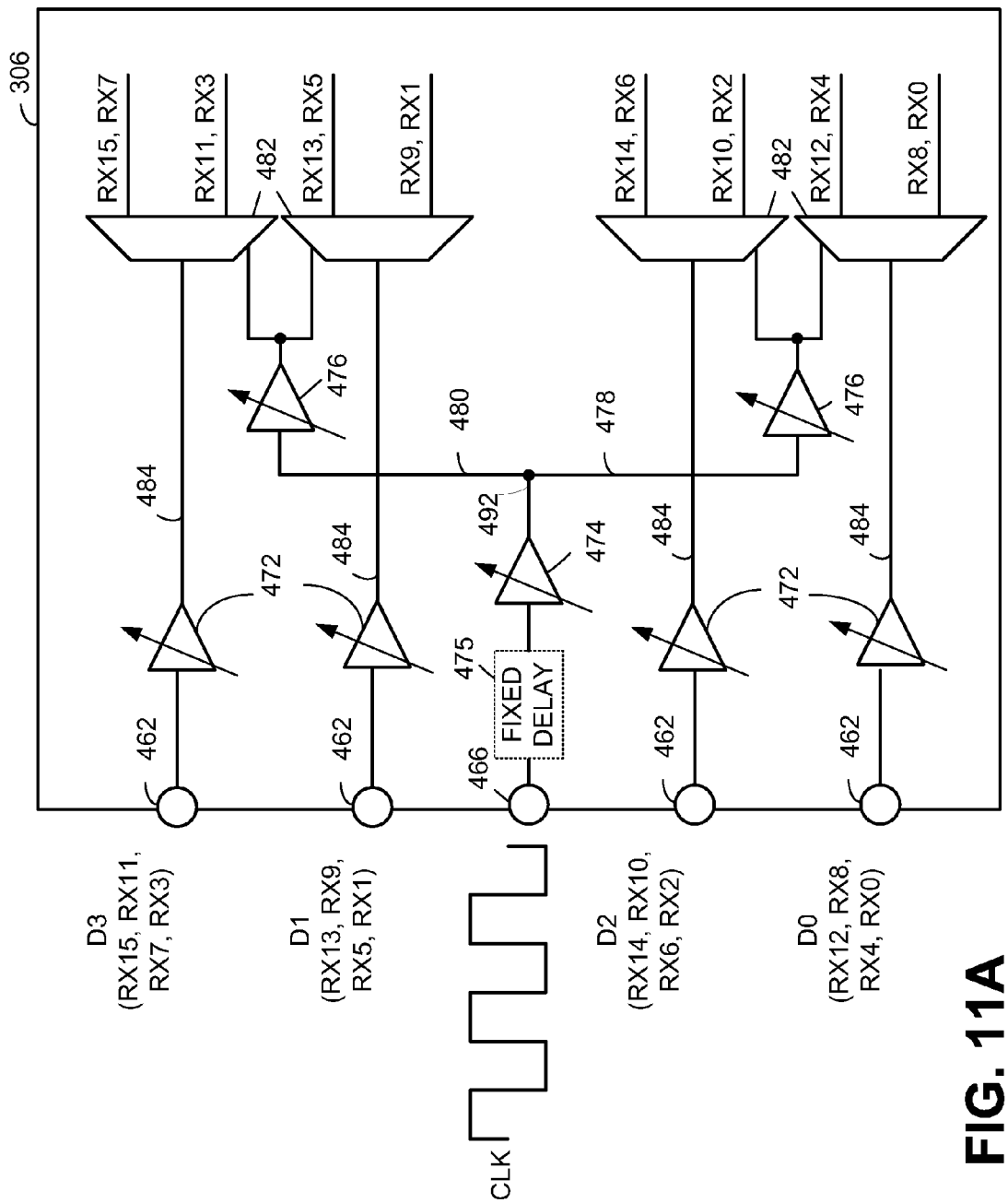
FIGS. 11A-11D illustrates various embodiments that compensate for signal skewing.

FIG. 11A provides a block diagram illustrating a signal delay compensation structure within demultiplexer circuit 306. In this embodiment, a distributed programmable delay tree is utilized. Here, data lines D0-D3 are received at input ports 462. The clock signal is received at input port 466. In this instance, demultiplexers 482 demultiplex the data on the clock positive and negative going edges. However other clock schemes known to those skilled in the art may be utilized. As is illustrated, the demultiplexer integrated circuit 306 receives data on four data lines, D3, D2, D1, and D0. Data line D3 carries RX data bits RX15, RX11, RX7, and RX3. Data line D1 carries RX data bits RX13, RX9, RX5, and RX1. Data line D2 carries RX data bits RX14, RX10, RX6, and RX2. Data line D0 carries RX data bits RX12, RX8, RX4, and RX0. A second level of demultiplexers (not shown) is required to produce 16 data lines, each carrying a single RX data bit.

First level delay elements 472 make adjustments between the various data signals within a certain delay range. For example, the delay element may be designed to allow plus or minus 10 picoseconds. Delay element 474, located in trunk 492 of the clock circuit, compensates for a skew component common to the clock provided to all demultiplexers 482. This component is typically the predominant component of the skew. Delay element 474 corrects a combination of skew created internally in the demultiplexer circuit 308 and will match the clock path from demultiplexer circuit 308 to demultiplexer circuit 306 illustrated within FIGS. 10A and 10C. As described further below, delay element 474 also includes an adjustment to compensate for permissible variations in the operating frequency of the clock signal. Delay element 474 provides a variable delay. Fixed delay element 475 may also be included, which adds a fixed delay in addition to the variable delay provided by delay element 474. This element is depicted within FIGS. 11A and 11B but is not required. One manner in which fixed delay element 475 provides this fixed delay is via a serpentine path between input port 466 and variable delay element 474. However, other techniques known to those skilled in the art may be used to achieve the necessary delay.

Second level delay elements 476 couple to delay element 474 via branches 478 and 480. These branches 478 and 480 may be symmetrical. The output of second level delay elements 476 clocks demultiplexers 482. The delays provided by the second level delay elements 476 may be separately controlled to provide selected delay levels to the clock prior to being applied to their individual demultiplexers 482. The second-level delay elements 476 and 478 compensate for a secondary component of the clock/data skew specific to their downstream demultiplexers. Thus, in one embodiment, the delay range is designed to be plus or minus 10 picoseconds. Thus, a total clock delay of plus or minus 20 picoseconds is distributed over the two levels of delay elements, the first half being applied to the clock globally, and the other half being applied to the clock locally. Another delay element, not shown, may provide compensation for skewing associated with each individual demultiplexer 482.

The range of delay provided by these delay elements overcomes the difference in the clock/data skew between the various lines caused by PC board designs, package mounting, or internal circuit pathway designs. FIG. 10A-10C illustrates the circuit pathways external to the data conversion circuits that cause skew between the clock and data signals as well as between the data signals themselves. The layout of the multiplexers and demultiplexers of the data conversion circuits of the present invention cause addition clock/data skew and data/data skew. The structure of FIGS. 11A-11D compensates for skew caused by both internal and external variations in path length. By symmetrically laying the data circuit pathways 484 about the distributed clock signal, skew caused by non-symmetry internal to the integrated circuit is reduced. Delay elements, such as those illustrated in FIGS. 11A, 11B and 11C, may be used to provide fine-timing of delay to further reduce these problems.

Figure 11B:
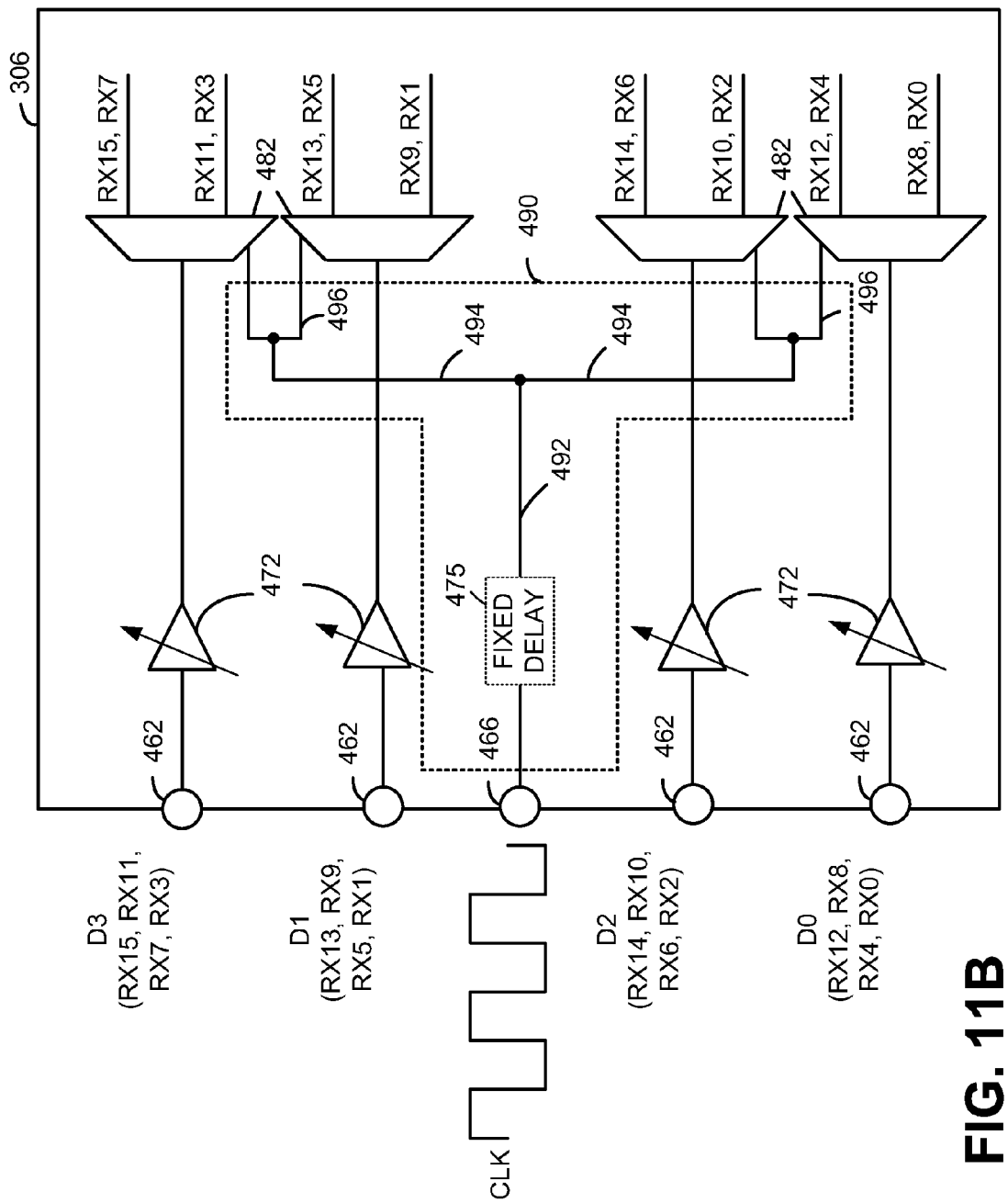

FIG. 11B depicts a demultiplexer circuit similar to that depicted in FIG. 11A. However, the circuit pathways, and in particular the clock circuit pathways, are symmetrically patterned to reduce or eliminate the need for delay elements while providing substantially equal transmission times to demultiplexers 482. In the structure of FIG. 11B, a distributed programmable delay tree is not utilized to distribute the clock signal from port 466. However, a programmable delay structure may or may not be used to adjust the various data signals. FIG. 11B illustrates the symmetrical nature of the data clock pathway such that the data clock signal arrives at each multiplexer 482 at about the same time. This is achieved by having substantially equal transmission times of the clock signal along the clock distribution circuit. Here, clock distribution circuit 490 comprises a central trunk 492. From this central trunk extend symmetrical branches 494. Depending on the number of multiplexers employed and their physical location, a further set of symmetrical branches 496 may distribute the clock signal to the individual multiplexers 482. Central trunk 492 is located approximately midway between the circuit pathways associated with input ports for signals D1 and D2. Fixed delay element 475. located along the path of central trunk 492 is also depicted in FIG. 11B. This optional element compensates for common transmission time variations between the data circuit pathways and clock distribution circuit 490. The clock signal may be provided to downstream circuits. This capability is common to both multiplexers and demultiplexers. Although not shown in FIGS. 11A and 11B, this ability is shown in FIGS. 11C and 11D.

Symmetry eliminates or reduces the need for delay elements within the clock distribution circuit. Similar symmetry may eliminate the need for delay elements 472 within the data circuit pathways. By eliminating the delay elements, the overall circuit is simplified, the power consumption is reduced and the overall integrity of the data is improved. Note that an optional fixed delay element 475 may or may not be required in order to compensate for the differing path lengths and the delays that may be introduced by the variable delay elements 472.

Figure 11C:
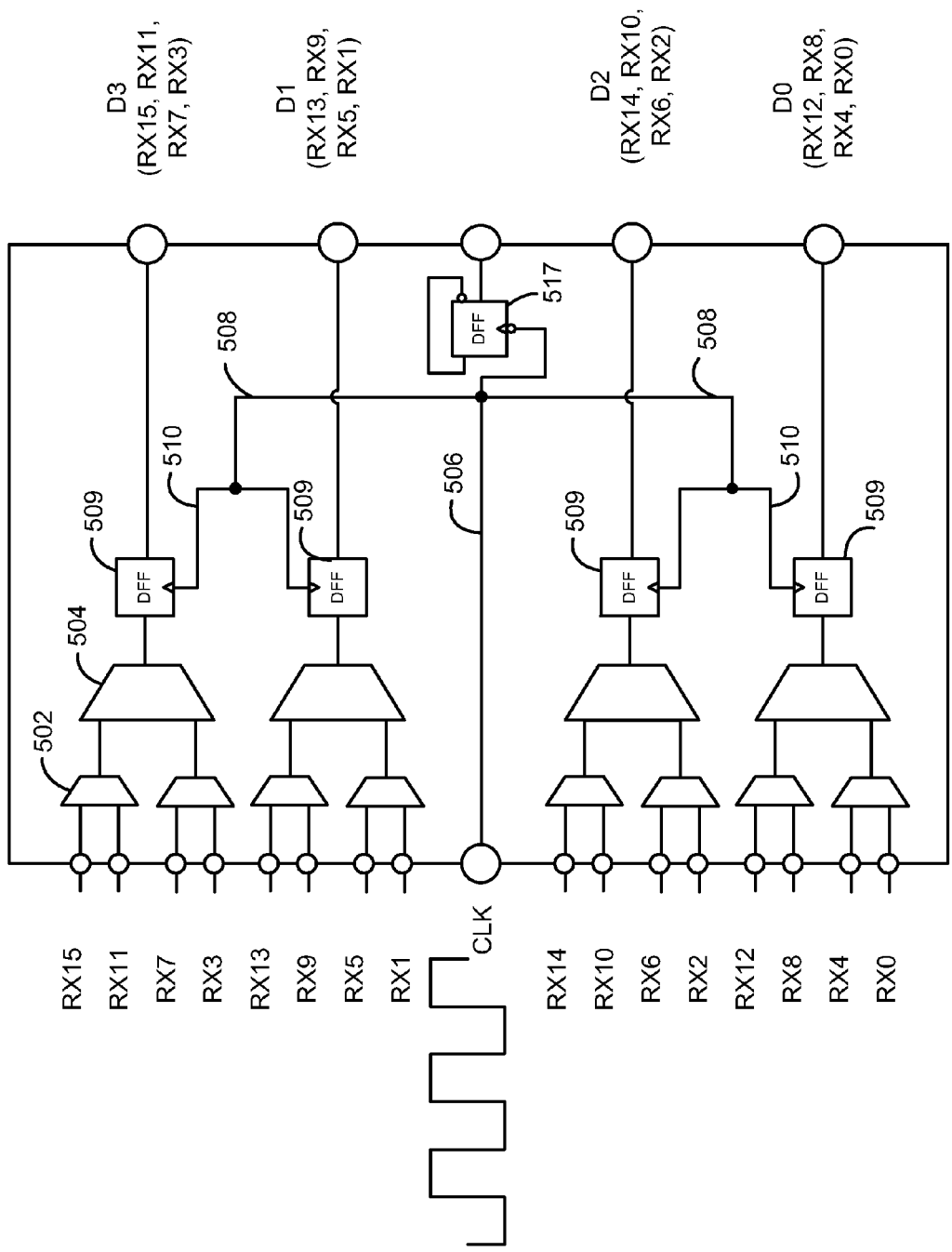
Figure 11D:
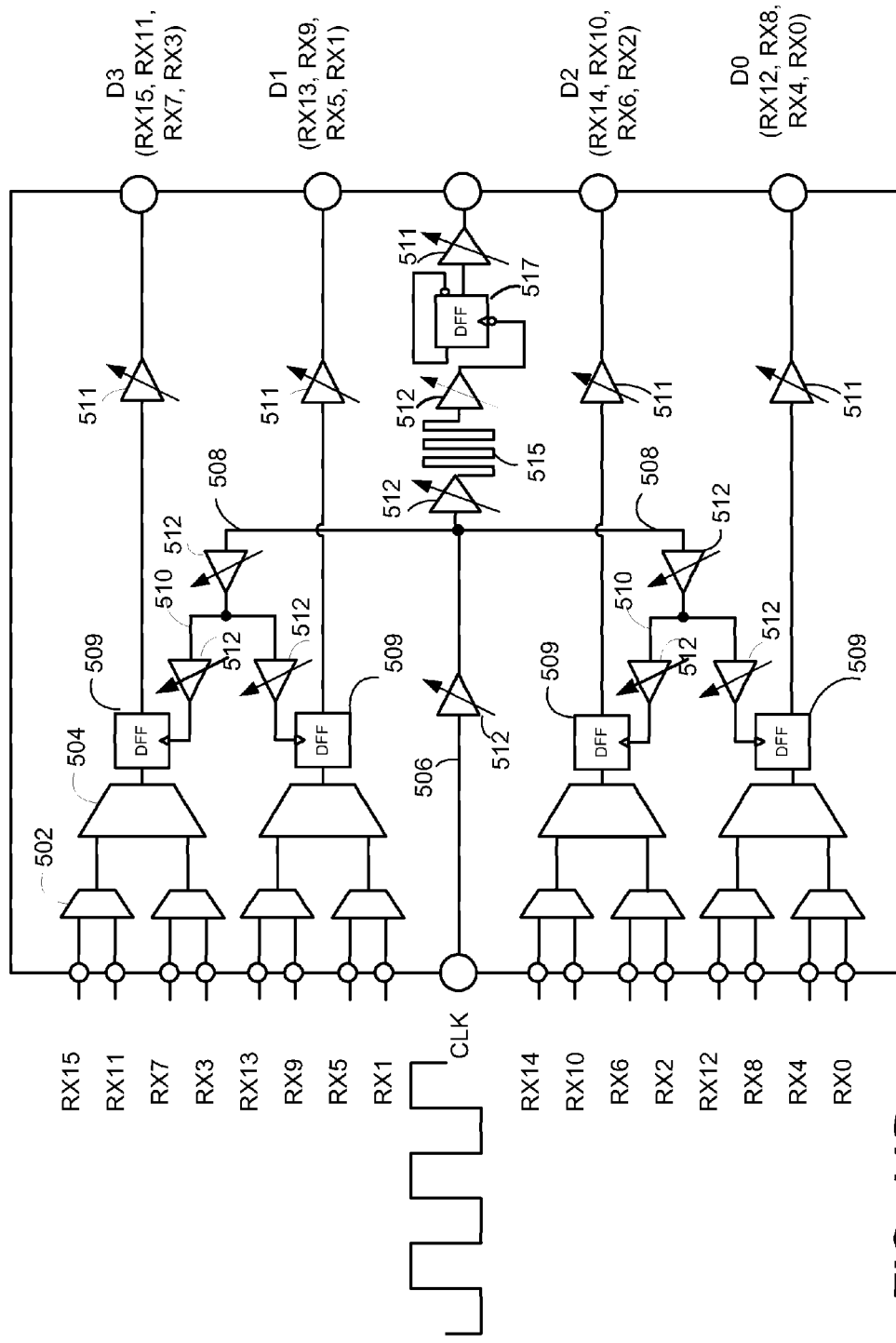

FIG. 11C depicts a multiplexing circuit utilizing a symmetrical distributed clock. Here, 16 data lines are provided as input to a first set of multiplexers 502, for example from the communication ASIC 104A-104C. These multiplexers 502 output to a second set of multiplexers 504. In one embodiment, multiplexer 504 operates with a 5 GHz clock whose clock input is not shown. The output of multiplexers 504 inputs to retimers 509. These multiplexers allow a four to one multiplex function to take place, wherein the 16 inputs provided are reduced to four outputs on lines D0-D3. Retimers or DFFs 509 ensure the data is properly aligned in time to the output clock signal.

As shown, the clock is distributed from a central trunk 506 to a first set of symmetrical branches 508. The symmetrical branches 508 further divide into symmetrical branches 510 which provide the clock signal to DFFs 509. In this way, the clock signal is uniformly distributed to DFFs 509 while minimizing skewing. Symmetrical distribution of the clock signal reduces or minimizes skewing by having each clock signal pathways have substantially equal transmission times. The clock signal may be further distributed to a downstream circuit through the port coupled to divider circuit 517. In one embodiment, DFF 517 has a feedback loop and acts as a divide by two circuit that allows a 10 GHz clock to be reduced to a 5 GHz clock. Additionally, DFF circuit 509 and DFF 517 may be triggered on opposite edges of the clock signal to ensure that the data outputs D0-D3 are centered with respect to the outputted clock signal. For example, DFFs 509 may trigger on the rising edge while DFF 517 triggers on the falling edge.

FIG. 11D is similar in nature to the multiplexer depicted in FIG. 11C. However, central trunk 506, as well as symmetrical branches 508 and 510 may each contain variable delay elements 512 that allow the clock signal distributed to individual DFFs 509 to account for skewing that occurs due to differences in any given clock circuit pathway. These retimers reduce data skewing and are triggered by the leading edge of the clock signal provided to DFFs 509. Although the delay elements may be used to entirely compensate for any skewing, the symmetrical nature of the distribution of the clock signal to DFFs 509 minimizes power consumption associated with individual delay elements and thus, the power consumption of the circuit as a whole. Further, variable delay elements 511 may be required to cause the output data signals D3, D2, D1, D0 to be aligned with the outputted clock signal.

The clock signal may be further distributed to a downstream circuit through the port coupled to divider circuit 517. As shown in FIG. 11D, delay buffers 512, serpentine pathway 515, or other like methods, may delay the clock signal to ensure its integrity with respect to the data. DFF 517 and its associated feedback loop are triggered on the opposite edge of the clock signal from that used to trigger DFF 509. Triggering on the opposite edge and using a DFF that acts as a divide by 2 circuit automatically center the data outputted as D0-D3 centered with respect to the clock signal outputted by DFF 517. In the shown embodiment a 1 GHz clock is reduced to a 5 GHz clock. This allows the clock signal to be properly timed at the output port to the data signals.

FIGS. 11A through 11D clearly illustrate the symmetrical nature of the clock distribution wherein the physical path length of the pathways are substantially equal to allow substantially equal transmission times along any given data or clock pathway. A particular advantage of the delay structure of FIGS. 11A-11D relates to the central location of the clock with respect to the data. This symmetrical clock arrangement ensures that the clock is not skewed once it enters the data conversion circuits.

Figure 12A:
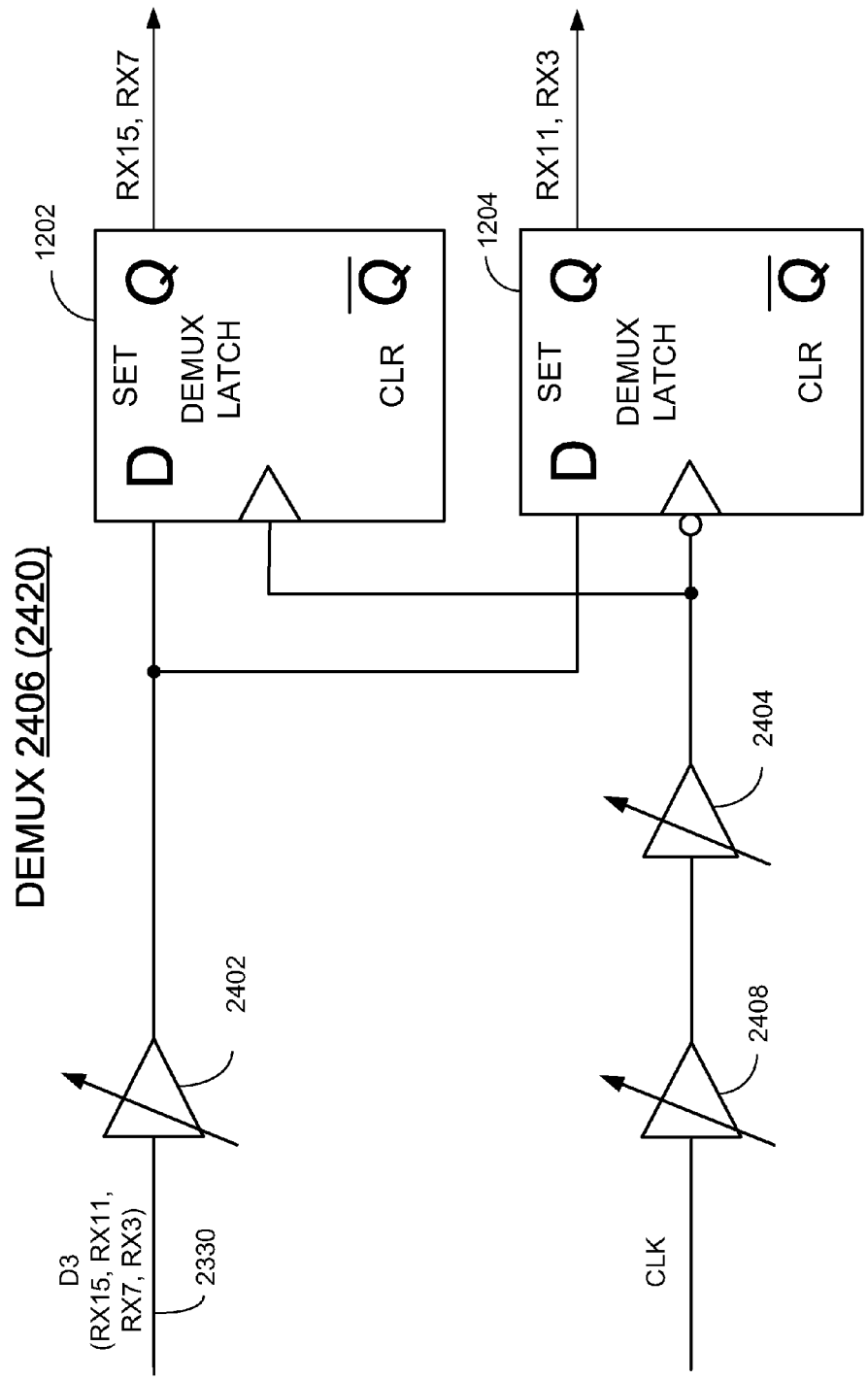
FIG. 12A is a block diagram illustrating a structure employed to implement demultiplexers of the CMOS RX data demultiplexer circuit according to the present invention.

FIG. 12A is a block diagram illustrating a structure employed to implement demultiplexers of the CMOS RX data demultiplexer circuit according to the present invention. The structure of FIG. 12A performs the demultiplexing function of demultiplexers 482. FIG. 12A also illustrates the relationship of the data and clock inputs to the delay elements 472, 474, and 476.

Demultiplexer latches 1202 and 1204 are coupled to the D3 data input and a common clock input from the output of second-level delay element 476. Demultiplexer latch 1202 is triggered by the positive edge of the clock and demultiplexer latch 1204 is triggered on the negative edge of the clock. On the positive edge of a first clock cycle, bit RX15 is latched into demultiplexer latch 1202 and provided as an output. On the negative edge of the first clock cycle, RX11 is latched into demultiplexer latch 1204 and provided as an output. During a next clock cycle bit RX7 is latched into demultiplexer latch 1202 on a positive edge and provided as an output while RX3 is latched into demultiplexer latch 1204 on a negative edge and provided as an output.

Figure 12B:
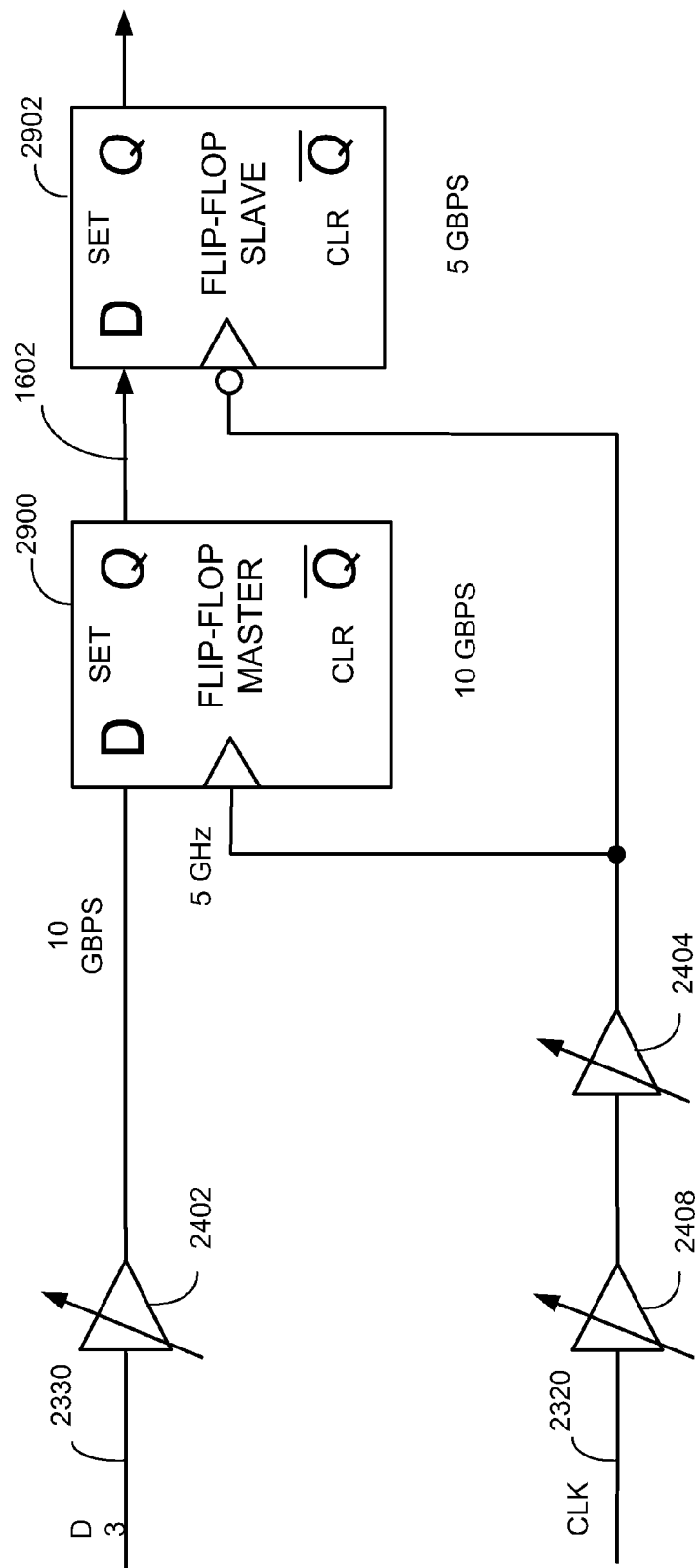
FIG. 12B is a block diagram illustrating a master/slave flip-flop arrangement used for the demultiplexer latches of FIG. 12A.

FIG. 12B is a block diagram illustrating a master/slave flip-flop arrangement used for the demultiplexer latches of FIG. 12A. This particular master/slave flip-flop arrangement is used for implementing the demultiplexer latches 1202, 1204 of demultiplexers 482. In typical applications, the D flip-flops that implement demultiplexer latches 1202, 1204 are clocked at the same rate as their incoming data. They are positive edge triggered, so the flip-flop master 2900 and flip-flop slave 2902 are also clocked at the same frequency as the incoming data D3 2330. In that case both the flip-flop master 2900 and flip-flop slave 2902 must operate at the data rate, which in the case of the RX data demultiplexer circuit 306, is 10 GBPS. As previously discussed, flip flops (and the latches contained therein) capable of operating at 10 GBPS in a conventional 0.13 micron CMOS process each requires two very large inductors to compensate for the parasitic capacitance that is problematic at such high frequencies of operation. Thus, in the example of the RX data demultiplexer circuit 306, four channels each having four demultiplexers, each having two D flip-flops, each having two latches translates to thirty-two very large inductors to implement the system at 10 GBPS. The die area for this implementation would be enormous and costly.

However, because the demultiplexers are set up to operate such that demultiplexer latches 1202, 1204 alternate clocking data from D3 2330, on opposite edges of a 5 GHz clock, the flip-flop slave 2902 of the demultiplexer latches 1202, 1204 can be implemented with a design that is required to operate at only 5 GHz. Flip-flop master 2900 still receives 10 GBPS data in over data line D3 2330, and therefore must still be able to read data at that rate (even though it clocks in only every other bit on the positive edge of the 5 GHz clock 2320). Because flip-flop slave 2902 is receiving only every other bit of D3 2330 at 5 GHz, and because it is only being clocked at 5 GHz, it is able to function with a design that need only accommodate a 5 GBPS data rate and 5 GHz clock. Such a design may be implemented in the conventional 0.13μ CMOS process without need for an inductor. Thus, only half of the inductors would be needed (that is, 16 rather than 32), which provides a tremendous saving in die area over a conventional demultiplexing flip-flop implementation.

Figure 13:
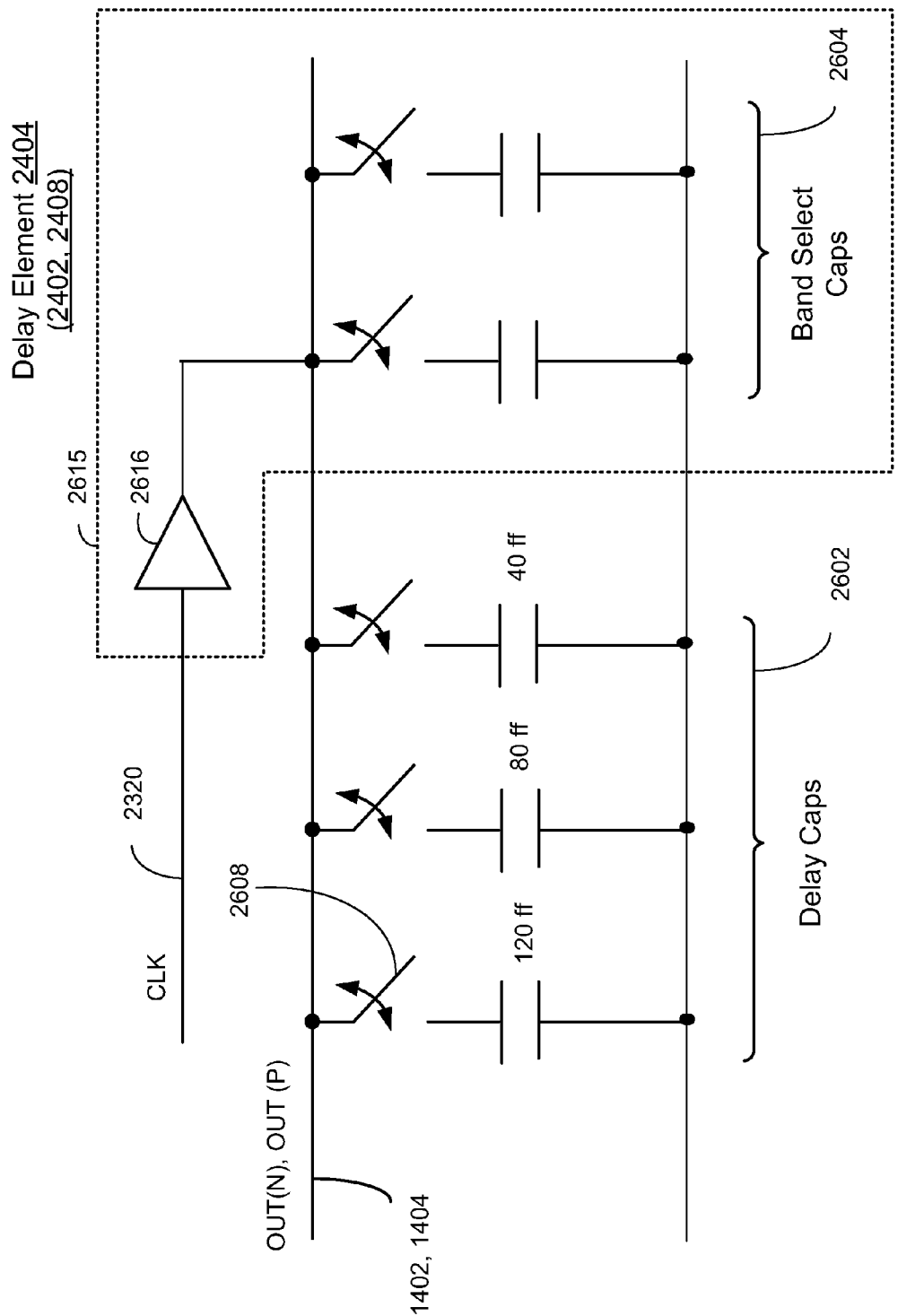
FIG. 13 is a circuit diagram illustrating a delay element constructed according to the present invention.

FIG. 13 is a circuit diagram illustrating a delay element (472, 474, and/or 476 of FIGS. 11A-11D and 12A-12B) constructed according to the present invention. The particular capacitance values illustrated in FIG. 13 are particular to the delay element 474. Capacitors 2602 are introduced in increments to cause the delay element 474 to introduce corresponding delays. The reader will appreciate that the total capacitive load introduced by the delay capacitors 2602 will increase or decrease a tuned driver 2615 output response time. The total capacitance coupled to the output of the tuned driver 2615 by the delay capacitors 2602 can thus be controlled with an n-bit digital setting (the length of the setting will depend upon the total number of capacitors that make up the network), the bits of which each control one of the switches 2608.

Thus, the delay capacitors 2602 may be coupled to the output of the driver 2615 of the delay element in combinations of 0, 40, 80, 120, 160, 200, and 240 femto farads (ff, $10^{-15}$ farads). To produce a delay range of +/−0.10 picoseconds of the delay element 474, the delay is normalized to the center position with a load of 120 ff. Thus, the clock edge can be retarded using additional capacitance, or it can be advance using less capacitance. The reader will appreciate that differing levels of delay may produced using different sized drivers and differing capacitor values.

Empirically, it can be determined what total delay range must provided for a particular application by examining the jitter specifications that must be met between the transmitting and receiving circuits, and the nature of the delays that are created in generating the clock and data signals as well as transmitting them between chips or circuit blocks. For the example of the RX data demultiplexer circuit 306 coupled to the InP demultiplexer circuit 308, it was determined that about 40 ps of total delay was needed to adequately compensate for skewing. between clock and data for the Q40 interface previously discussed. It was also determined that because the clock signal was rendered sinusoidal in nature by the parasitic effects of the boards traces, it could be delayed the most without further degrading the quality of the clock signal. The data, on the other hand, became increasingly degraded based on the amount of delay imposed. Thus, the bulk of the delay adjustment was allocated to the clock signal, and the clock was placed in the middle of the delay structure between the two sets of data lines in order to facilitate the adjustment of the skew.

Once the total range of delay that is required for an application has been determined, the optimal settings for the capacitance arrays of all of the delays may be determined through a circuit test that varies the settings until the optimal setting is determined. Because variations in the clock/data relationship will remain reasonably constant, once a digital word representing the settings for all of the delays has been determined for the setting, it can be programmed into all of the RX data demultiplexers 306 manufactured for a given board design and/or package. Programming of the delay capacitors 2602 can be accomplished by programming the word into a memory maintained in the circuit, or it could be programmed by the tester through fuse programmable links.

The amount of delay that is distributed among the delay elements of the delay structure of the invention will vary from one application to another. The specific example provided herein is therefore not intended to be a limitation, but only to be instructive in applying the invention to various applications. Moreover, although delays can be significantly greater for signal interfaces between chips, it is conceivable that such skews between internal circuit blocks could also benefit from application of the present invention.

As previously mentioned, in the example the of the RX data demultiplexer circuit 306 coupled to the InP demultiplexer circuit 308, the data rate is permitted to range between 9.9 GHz and 11.1 GBPS. The clock can also vary between 5 and 6.6 GHz. This fact introduces an additional effect on the clock/data relationship. Therefore, in the delay element 474 includes band-select capacitors 2604 that are coupled to the output of driver element 2616 are used to compensate for variations in the input clock and data rates.

Figure 14:
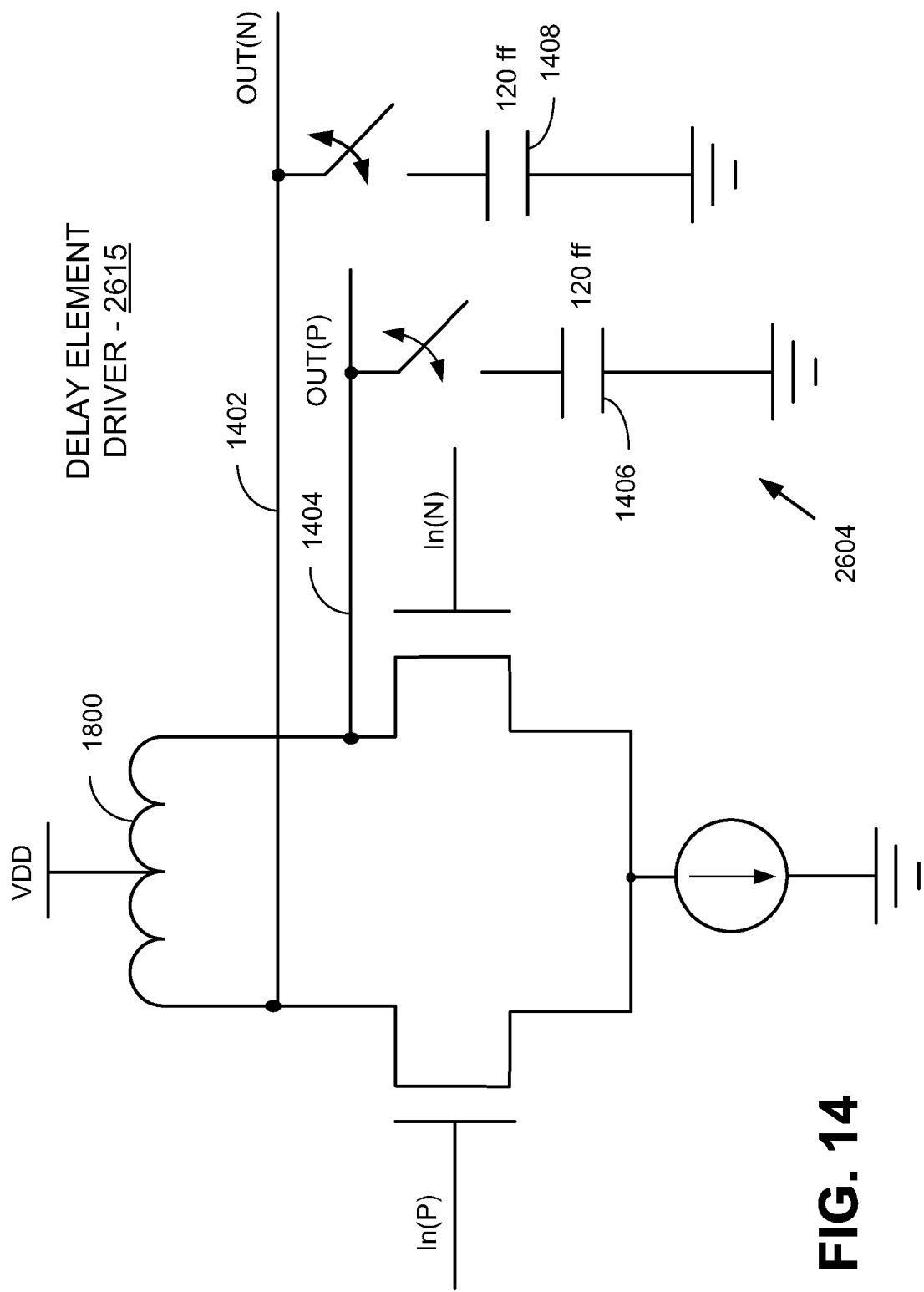
FIG. 14 is a block diagram illustrating a differential configuration of the delay element driver constructed according to the present invention.

FIG. 14 is a block diagram illustrating a differential configuration of the delay element driver 2615 constructed according to the present invention. Using a conventional buffer amplifier as the delay element driver 2615 of FIG. 13 (of the delay elements 2402, 2404) with center load impedance 1800 renders a particular response at the frequencies of the clock and data (that is, 5 and 10 GHz respectively) that may be unsuitable for latching data into the demultiplexers (2406, 2420 FIG. 11) because a standard driver would not be able to drive the load of the demultiplexers 2406 and 2420 at those frequencies.

Thus, according to the present invention, each of the differential outputs OUT(N) 1402. and OUT(P) 1404 includes tuning capacitors 1406 and 1408 that are controlled based upon a selected frequency of operation. For simplicity, the delay element 2404 of FIG. 13 was shown single-ended and the reader will appreciate how the delay element driver 2415 is illustrated in a double-ended fashion in FIG. 14. The delay element driver 2615 of FIG. 14 can be tuned using the band select capacitors 1406 and 1408 to cancel the effects of the inductive center load impedance 1800.

The quality factor (that is, "Q") of the tuned response of the delay element driver 2615 must be optimized. If the Q is too high, the response will look like that of FIG. 15A, where the gain of the buffer amplifier 2615 is sufficient at 120 ff delay capacitor 2602 loading, but is less than sufficient on either side of the center capacitance value of 120 ff. If the Q is lowered, the gain flattens out and remains sufficient over the entire range of the delay capacitor network 2602 as illustrated in FIG. 15B. The Q cannot be too low either, because the overall gain will begin to drop below a level that is adequate.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (for example, an item includes, but is not limited to, a component, an element, a circuit, and/or a module) where, for indirect coupling, the intervening item does not modify the information of a signal but may adjust its current level, voltage level, and/or power level. As may further be used herein, inferred coupling (that is, where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

What is claimed is:

1. A high speed bit stream data conversion circuit comprising:
a plurality of data conversion circuits to receive a first plurality of bit streams at a first bit rate and to produce at least one second bit stream at a second bit rate;
a plurality of symmetrical data circuit pathways that include pairs of circuit pathways, and that transport the first plurality of bit streams to the plurality of data conversion circuits, wherein transmission time for each of the first plurality of bit streams are substantially equal; and
a clock distribution circuit that receives a data clock signal, wherein the clock distribution circuit substantially symmetrically distributes the data clock signal to the plurality of data conversion circuits along a plurality of substantially symmetrical clock circuit pathways, wherein the plurality of substantially symmetrical clock circuit pathways include a trunk that is oriented along a bisection of the plurality of symmetrical data circuit pathways and includes substantially symmetrical branch pairs that extend outward from the trunk such that clock transmission time is substantially equal for each of the substantially symmetrical branch pairs, wherein each of the substantially symmetrical branch pairs correspondingly couple to each of the plurality of data conversion circuits.

2. The high speed bit stream data conversion circuit of claim 1, wherein the clock distribution circuit further comprises:
a plurality of fixed or programmable delay elements operable to compensate for skewing of the data clock signal received by each data conversion circuit.

3. The high speed bit stream data conversion circuit of claim 2, wherein each of the plurality of programmable delay elements comprise:
switched capacitor networks that introduce delay increments based on a capacitance coupled to a buffer amplifier.

4. The high speed bit stream data conversion circuit of claim 3, wherein the capacitance coupled to the buffer amplifier is a variable capacitance.

5. The high speed bit stream data conversion circuit of claim 4, wherein the variable capacitance increases or decreases the buffer amplifier delay time.

6. The high speed bit stream data conversion circuit of claim 2, wherein each symmetrical data circuit pathway that transports the first plurality of bit streams further comprises:
a retimer to ensure data integrity between the first plurality of bit streams and the at least one second bit stream.

7. The high speed bit stream data conversion circuit of claim 1, wherein:
a physical length of each symmetrical data circuit pathways is substantially equal, and
a physical length of each symmetrical clock circuit pathway is substantially equal.

8. A method of converting high speed data bit streams from a first bit rate to a second bit rate, wherein the first and second bit rate differ, comprising:
receiving a first plurality of bit streams at a first plurality of input ports;

distributing the first plurality of bit streams to a plurality of data conversion circuits along a plurality of symmetrically-situated circuit pathways;

symmetrically distributing a clock signal to the plurality of data conversion circuits along a plurality of symmetrically-situated clock circuit pathways, wherein clock transmission times associated with each clock circuit pathway are substantially equal, and wherein the symmetrically-situated data circuit pathways are symmetrically-situated relative to the symmetrically-situated clock circuit pathways; and latching data at the data conversion circuits from the first plurality of bit streams with the distributed clock signal to produce a second bit stream.

9. The method of claim 8, further comprising:

delaying the distributed clock signal within individual symmetrically-situated clock circuit pathways to compensate for skewing of the data clock signal received by each data conversion circuit; and retiming data at the individual data conversion circuits to compensate for skewing of data within the first bit streams received by each data conversion circuit.

10. The method of claim 9, wherein delaying the distributed clock signal further comprises introducing delay elements with switched capacitor networks.

11. The method of claim 10, wherein the switched capacitor networks provide a controlled variable capacitance.

12. The method of claim 11, wherein the data conversion circuits comprise a multiplexer, wherein a number of first bit streams exceeds a number of second bit streams, and wherein the second data rate exceeds the first data rate.

13. The method of claim 12, wherein the first bit streams include 4 bit streams at about 10 GBPS, and wherein the second bit streams include 1 bit stream at about 40 GBPS.

14. The method of claim 12, wherein the first bit streams include 16 bit streams at about 2.5 GBPS, and wherein the second bit streams include 4 bit streams at about 10 GBPS.

15. The method of claim 12, wherein a physical length of each symmetrically-situated data circuit pathway is substantially equal, and wherein a physical length of each symmetrically-situated clock circuit pathway is substantially equal.

16. The method of claim 9, wherein retiming data further comprises introducing delay elements with switched capacitor networks.

17. A clock distribution circuit for a high speed bit stream data conversion circuit that includes a plurality of data conversion circuits coupled by a plurality of symmetrical data circuit pathways, the plurality of data conversion circuits receive a first plurality of bit streams at a first bit rate and to produce at least one second bit stream at a second bit rate, the clock distribution circuit is configured to:

substantially symmetrically distribute the data clock signal to the plurality of data conversion circuits along a plurality of substantially symmetrical clock circuit pathways, wherein the plurality of substantially symmetrical clock circuit pathways include a trunk that is oriented to a bisection of the plurality of symmetrical data circuit pathways and includes substantially symmetrical branch pairs that extend outward from the trunk such that clock transmission time is substantially equal for each of the substantially symmetrical branch pairs, wherein each of the substantially symmetrical branch pairs correspondingly couple to each of the plurality of data conversion circuits.

18. The clock distribution circuit of claim 17, further comprises:

a plurality of fixed or programmable delay elements operable to compensate for skewing of the data clock signal received by each data conversion circuit.

19. The clock distribution circuit of claim 18, wherein each of the plurality of programmable delay elements comprise:

switched capacitor networks that introduce delay increments based on a capacitance coupled to a buffer amplifier.

20. The clock distribution circuit of claim 19, wherein the capacitance coupled to the buffer amplifier is a variable capacitance that increases or decreases the buffer amplifier delay time.

* * * * *